United States Patent [19]

Marvin

[11] Patent Number: 5,781,195
[45] Date of Patent: Jul. 14, 1998

[54] METHOD AND SYSTEM FOR RENDERING TWO-DIMENSIONAL VIEWS OF A THREE-DIMENSIONAL SURFACE

[75] Inventor: John Marvin, Kirkland, Wash.

[73] Assignee: Microsoft Corporation, Redmond, Wash.

[21] Appl. No.: 632,847

[22] Filed: Apr. 16, 1996

[51] Int. Cl.[6] .................................................. G06F 15/00
[52] U.S. Cl. .................................................. 345/428
[58] Field of Search .................................. 395/357, 358; 345/428, 429, 430, 419

[56] References Cited

U.S. PATENT DOCUMENTS

| | | | |
|---|---|---|---|
| 5,448,696 | 9/1995 | Shimada et al. | 395/161 |
| 5,638,523 | 6/1997 | Mullet et al. | 395/357 |

*Primary Examiner*—Phu K. Nguyen
*Attorney, Agent, or Firm*—Jones & Askew, LLP

[57] ABSTRACT

A method and system for rendering a two-dimensional image of a three-dimensional surface in real time directly from surface-feature data stored in computer-readable format. A two-dimensional screen display may therefore be rendered "on the fly" for any view point, altitude, and orientation in three-dimensional space. Changing the view point enables panning, changing the altitude allows zooming, and changing the orientation allows spinning of the image. Successive two-dimensional renderings from an initial field of view are rendered to present a sequence of screen displays that effectively pan, zoom, or spin the image of the three-dimensional surface. The rendering methods are sufficiently fast when implemented on preferred personal computer systems so as to enable panning, zooming, and spinning at a satisfactory rate in response to user commands. To the user, the surface features appears to pan, zoom, or spin in real time. Two-dimensional views may be rendered of any three-dimensional structure such as an airplane, power plant, anatomical organ, atomic particle, etc. In particular, two-dimensional views of maps of the surface of the Earth are rendered in connection with a multimedia world atlas computer program.

20 Claims, 13 Drawing Sheets

PAN

ZOOM

CHANGE ORIENTATION

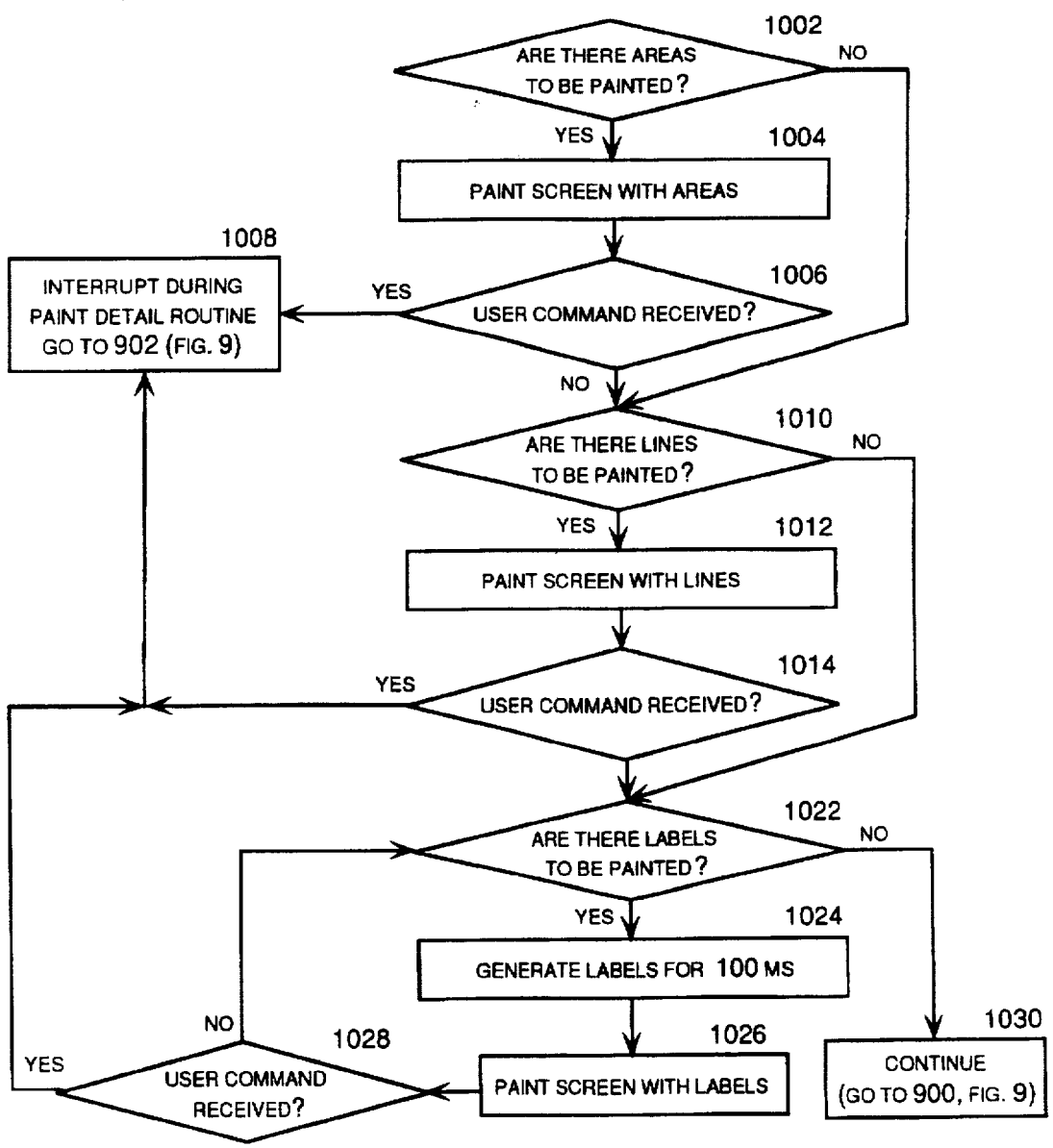

METHOD AND SYSTEM FOR RENDERING TWO-DIMENSIONAL VIEWS OF A THREE-DIMENSIONAL SURFACE

TECHNICAL FIELD

The present invention relates to computer-implemented rendering systems and, more particularly relates, to an improved method and system for rendering two-dimensional views of a three-dimensional surface.

BACKGROUND OF THE INVENTION

Lewis and Clark had to cross the Nation by canoe and horseback to obtain the information necessary to create the first rudimentary maps the vast Northwest territories of the fledgling Unites States. Modem "desktop explorers" are not so hindered. Thanks to personal computers and world atlas software, accurate maps of the surface of the Earth can be accessed in seconds from the comfort of one's home or office. Modem atlas software, however, provides much more than accurate maps. Increasingly powerful personal computers and atlas software allow specific locals to be correlated with tabular, graphical, video, and audio information to reward the desktop explorer with entertaining and informative multimedia visits to far away places.

Multimedia techniques make computer software "come alive" in an entertaining and user-friendly manner that allows children and adults with only basic computer skills to enjoy and learn as never before. Consumer demand is therefore strong for increasingly entertaining and informative multimedia software. The increasing data storage and processing capabilities of personal computers drive the need for innovation in the development of multimedia atlas software. New computer software techniques are constantly in demand to take advantage of the ever increasing hardware capabilities of personal computers. Much effort therefore goes into improving the speed, accuracy, and content of multimedia atlas software for personal computers.

A particularly compelling multimedia experience is produced when the user is allowed to interact with the atlas software in real-time. For example, it is advantageous to allow a user to selectably pan, zoom, and spin over a map image in response to user commands to simulate flying over the Earth. Such an interactive presentation of map data, together with a generous compliment of multimedia effects, is both entertaining and informative for users. With such a system, the user may "fly" over the globe from one local to another, stopping along the way to experience multimedia visits at various locations. Producing atlas software with real-time interactive features such as panning, zooming, and spinning, along with a generous multimedia database, is a challenging task for the computer cartographer.

In particular, computer cartographers must address the vexing problem of rendering two-dimensional screen display images of the three-dimensional surface of the Earth. Conventional methods for rendering two-dimensional maps of the Earth that have been used for millennia have significant drawbacks. For example, a simple geometric projection in which the Earth's lines of longitude and latitude are projected to a rectangular grid produces extreme distortions in the polar regions. Thus, an inch on the map near a polar region represents much less distance on the Earth than does an inch near the equator. The result of a geometric projection is therefore a polar-distorted map in which the relatively small island of Greenland, for example, appears as large as a continental land mass. Geometric projections also become unstable at the exact polar locations, thus preventing panning over a pole in a computer-generated geometric projection system.

A Mercator projection, used by maritime navigators, addresses the polar distortion problem associated with geometric projections by exaggerating the distortion of the land masses in order to accurately project the seas. Thus, compared to a geometric projection, polar land masses such as Greenland appear even larger in a Mercator projection. Mercator projections were invaluable tools for early navigators. They are not, however, particularly useful for rendering maps in a computer-implemented atlas system in which it is preferable if both the land and the sea appear in proper perspective.

Conventional methods, such as orthographic and perspective projections, have been used to produce two-dimensional maps that present the land and the sea in proper perspective. The difficulty with these projection techniques is that the underlying three-dimensional data appears different from every vantage point. Therefore, an individual two-dimensional screen display must be rendered for each view that may be displayed. It is particularly difficult to pan over a map using geographic or perspective projections because the vantage point is constantly changing. Each individual screen display or frame in a panning sequence must therefore be individually rendered. Rendering an adequate number of screen displays to produce a smooth, multi-directional panning effect is a difficult challenge.

Prior art multimedia atlas software, such as "3D ATLAS" sold on CD-ROM by Electronic Arts of San Mateo, Calif., addresses the projection problem by prerendering a two-dimensional static bit map for each view that may be displayed to a user. Each two-dimensional static bit map is a pixelized image that can be directly painted to a computer display screen. The compilation of static bit maps, which is stored on the CD-ROM, is a very large data file that occupies a relatively large percentage of the available data storage capacity of the CD-ROM.

The static bit map approach employed in "3D ATLAS" has significant shortcomings. In particular, the large number of static bit maps stored on the CD-ROM severely limits the amount of detail that may be associated with each screen display. The data storage space available for other multimedia effects that add desirable richness to the atlas software is also severely limited. In addition, because a typical computer screen is rectangular, it is not possible to spin a static bit map rendered to fit a typical computer screen to change the orientation of the field of view.

In general, the trade-off for storing an adequate compilation of static bit maps to allow panning over the globe is a relatively Spartan database of other information. For example, in "3D ATLAS" there are only about 3,000 named places on the globe. Even with significant sacrifices in map detail and multimedia richness, panning over the globe is somewhat discontinuous as the display jumps from one screen display to the next, zooming is limited to a few discrete altitude levels, and spinning is not possible. Providing a sufficiently generous supply of screen displays to allow relatively smooth panning, zooming, and spinning would require more static bit maps than the CD-ROM can store.

Focusing on panning as a illustrative problem, one approach to improving the smoothness of panning is to increase the number of prerendered static bit maps so that the screen displays overlap more tightly. Additional data storage capability for this purpose may be provided through connection to a data server via a network or the Internet. Cost limitations aside, conventional networking techniques could provide a virtually unlimited data storage capability.

However, simply providing increased data storage capability does not solve the problems experienced in the prior art because panning speed is also an issue. Specifically, map panning is generally considered to be unacceptably slow if it takes more than a second or two to paint each screen display. Regardless of the processing speed of the host computer, downloading data over a network for each screen display would result in unacceptably slow panning performance for a typical personal computer and network configuration.

Even when all the screen displays of an increased static bit map system are available on a relatively fast mass-storage computer memory such as a CD-ROM, data retrieval speed still presents a significant limitation on panning performance. Each bit map for a typical computer monitor is 640 pixels wide by 480 pixels high, for a total of 300,000 pixels. Reading the data defining 300,000 pixels from a mass-storage computer memory such as a CD-ROM can take a significant amount of time.

Thus, there is a need for an improved method and system for rendering two-dimensional views of a three-dimensional surface. There is also a need for an improved method and system for storing data used to render two-dimensional views of a three-dimensional surface. More specifically, there is a need for a multimedia world atlas computer program for a personal computer that allows real-time panning, zooming, and spinning, and that provides a generous compliment of map detail and multimedia richness within the memory constraints of a conventional CD-ROM.

SUMMARY OF THE INVENTION

The present invention provides a method for rendering a two-dimensional image of a three-dimensional surface in real time directly from surface-feature data stored in computer-readable format. A two-dimensional screen display may therefore be rendered "on the fly" for any view point, altitude, and orientation in three-dimensional space. Changing the view point allows panning, changing the altitude allows zooming, and changing the orientation allows spinning of the image. Successive two-dimensional renderings from an initial field of view are rendered to present a sequence of screen displays that effectively pan, zoom, or spin the image of the three-dimensional surface. The rendering methods of the present invention are sufficiently fast when implemented on preferred conventional personal computer systems so as to enable panning, zooming, and spinning at a satisfactory rate in response to user commands. To the user, the surface features appears to pan, zoom, or spin in real time.

The present invention improves over prior art systems by rendering two-dimensional views of a three-dimensional surface "on the fly" rather than relying on a set of prerendered static bit maps. Rendering views "on the fly" produces a number of advantages including: (1) providing a virtually infinitely variable field of view selectable by the user, (2) significantly reducing the amount of data that must be stored to render views, (3) rendering views that properly take into account the three-dimensional character of the underlying data for any field of view, (4) panning, zooming, and spinning in real time without distortion, (5) flexible labeling of each field of view, and (6) flexibility to select map content "on the fly."

The present invention may be used to render two-dimensional views of any three-dimensional structure such as an airplane, power plant, anatomical organ, atomic particle, etc. In particular, a three-dimensional model of the surface of the Earth may be permanently stored on a CD-ROM. As overlapping prerendered two-dimensional static bit maps are avoided, the amount of map-rendering data that must be stored is greatly reduced. The reduced memory requirement for map-rendering data allows increased map detail and multimedia effects such as tabular, graphical, video, and audio information to be stored on the CD-ROM. Resulting advantages include greater zoom range, increased map detail, and increased multimedia richness.

The present invention therefore allows increased storage capacity on a fixed memory resource such as a CD-ROM to be allocated to functions such as map detail. For example, "ENCARTA96 WORLD ATLAS, VERSION 1.0" sold on CD-ROM by Microsoft Corporation, includes about 1.4 million named places on the globe whereas another world atlas program using prerendered bit maps, "3D ATLAS" sold on CD-ROM by Electronic Arts, includes only about 3,000 named places on the globe.

A major advantage of the present invention is very rapid access to the stored three-dimensional database of information allowing two-dimensional orthographic projections to be rendered in real time. Real time panning, zooming, and spinning is enabled by novel programming techniques that reduce the number of "seek" operations required to retrieve data from a mass-storage computer memory such as a CD-ROM. A reduced-detail database to be displayed when panning, zooming, and spinning is selected and separated from detailed map data. Groups of spatially-contiguous reduced-detail pixels are stored as memory blocks, and groups of spatially-contiguous memory blocks are stored as sections, in sequentially-addressed memory locations within the mass-storage computer memory. Reduced-detail data is retrieved in sections from sequentially-addressed memory locations, thus reducing the number of "seek" operations required to retrieve the reduced-detail data.

The amount of detail in the reduced-detail database is dependent upon the desired performance and the speed of the processing hardware and software. Generally, the reduced-detail database is selected to present an amount of information sufficient to allow the user to understand what is shown on the display screen, while allowing real-time rendering of screen displays in an acceptable period of time. For example, the reduced-detail database may include color-coded topographical and bathological map data. The topographical and bathological reduced-detail database is visible while panning, zooming, and spinning, and other map details such as political boundaries, cities, rivers, and labels are not shown.

According to another aspect of the present invention, detail for a particular field of view is added in successive layers when the user stops panning, zooming, or spinning. For example, a first layer fills in area detail, a second layer fills in line detail, a third area fills in point detail, and a fourth layer fills in labels. Labels may also be broken down into a sequence of layers in accordance with a priority scheme. The user may interrupt detail rendering between layers by resuming panning, zooming, or spinning. This aspect of the present invention provides interactivity (i.e., interruptability upon user command).

According to another aspect of the present invention, when a "seek" operation is conducted to retrieve reduced-detail data from the mass-storage computer memory, spatially-contiguous data corresponding to an extended field of view is retrieved and stored in cache memory so that spinning and relatively small panning operations may be performed without retrieving additional data from the mass-storage computer memory.

Generally described, the present invention provides a method for rendering a two-dimensional view of a three-dimensional surface. A user command defining a field of view portion of the three-dimensional surface is received. A sequence of memory blocks comprising a reduced-detail three-dimensional surface corresponding to the field of view is defined wherein each memory block defines a group of spatially-contiguous pixels of the reduced-detail three-dimensional surface, and wherein the sequence of memory blocks defines a spatially-contiguous section of the reduced-detail three-dimensional surface. The section is retrieved from sequentially-addressed memory locations within a mass-storage computer memory. A two-dimensional projection of the section is computed, and the two-dimensional projection of the section is displayed on a display device.

More specifically described, a user command defining a field of view is interpreted as a view point vector and an orientation vector. The reduced-detail three-dimensional surface includes color-coded topographical and bathological map data. A sequence of memory blocks is selected by identifying the memory blocks in hybrid-quad-tree format. Each memory block includes at least about 128 spatially-contiguous pixels. Producing a two-dimensional projection of the section includes computing an orthographic projection of the section, and displaying the section includes painting a computer screen comprising at least about 300,000 pixels.

According to another aspect of the present invention, a method for rendering a panning sequence of two-dimensional views of a three-dimensional surface is provided. A user command defining a field of view comprising the panning sequence is received. A sequence of memory blocks comprising a reduced-detail three-dimensional surface corresponding to the field of view is selected wherein each memory block comprises a group of spatially-contiguous pixels of the reduced-detail three-dimensional surface, and wherein the sequence of memory blocks comprises a spatially-contiguous section of the reduced-detail three-dimensional surface. The section is retrieved from sequentially-addressed memory locations within a mass-storage computer memory. A two-dimensional projection of the section is computed, and the two-dimensional projection of the section is displayed on a display device. An interrupt queue is then checked for the occurrence of an interrupt condition, and if the interrupt condition has not occurred, the steps set forth above are repeated.

According to another aspect of the present invention, a method for rendering two-dimensional views of a three-dimensional surface is provided. A first user command defining a first field of view portion of the three-dimensional surface is received. A first sequence of memory blocks comprising the first field of view is selected. A cache memory is checked to determine whether the memory blocks comprising the first field of view are present within the cache memory. If the memory blocks comprising the first field of view are not present within the cache memory, an extended first field of view is read from the mass-storage computer storage memory into the cache memory. The extended first field of view comprises the first field of view and areas of the three-dimensional surface that are spatially-contiguous with the first field of view. A two-dimensional projection comprising the first field of view is computed, and the two-dimensional projection comprising the first field of view is displayed on a display device.

Continuing with the description of the method for rendering two-dimensional views of a three-dimensional, a second user command defining a second field of view portion of the three-dimensional surface is received. A second sequence of memory blocks comprising the second field of view is determined. The cache memory is checked to determine whether the memory blocks comprising the second field of view are present within the cache memory. If the memory blocks comprising the second field of view are present within the cache memory, the memory blocks within the cache memory are used to display a two-dimensional projection comprising the second field of view on the display device.

According to another aspect of the present invention, a method for rendering a panning sequence of two-dimensional views of a three-dimensional surface is provided. A reduced-detail database corresponding to the three-dimensional surface is defined. A detail database corresponding to the three-dimensional surface is also defined. The reduced-detail database is divided into a plurality of memory blocks wherein each memory block comprises a group of spatially-contiguous pixels. Memory blocks are grouped into a plurality of spatially-contiguous sections of the reduced-detail three-dimensional surface. Each section is stored in a plurality of sequentially-addressed memory locations within a mass-storage computer memory. A plurality of layers comprising the detail database are defined, and each layer is stored within the mass-storage computer memory.

Therefore, the present invention provides an improved method and system for rendering two-dimensional views of a three-dimensional surface. The present invention also provides an improved method and system for storing data used to render two-dimensional views of a three-dimensional surface. The present invention also provides a multimedia world atlas computer program for a personal computer that allows real-time panning, zooming, and spinning, and that provides a generous compliment of map detail and multimedia richness within the memory constraints of a conventional CD-ROM. Further advantages of the present invention may become apparent from a review of the following detailed description of the preferred embodiments and the appended claims and drawings.

BRIEF DESCRIPTION OF THE DRAWINGS

FIG. 2, including

FIG. 3, including

FIG. 4, including

FIG. 5, including

FIG. 6, including FIGS. 6A-6D, illustrates a hybrid-quad-tree data structure.

FIG. 10 is a logical flow diagram illustrating interruptable detail rendering in a computer-implemented atlas system.

DESCRIPTION OF THE PREFERRED EMBODIMENTS

The following detailed description is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Figure 1:
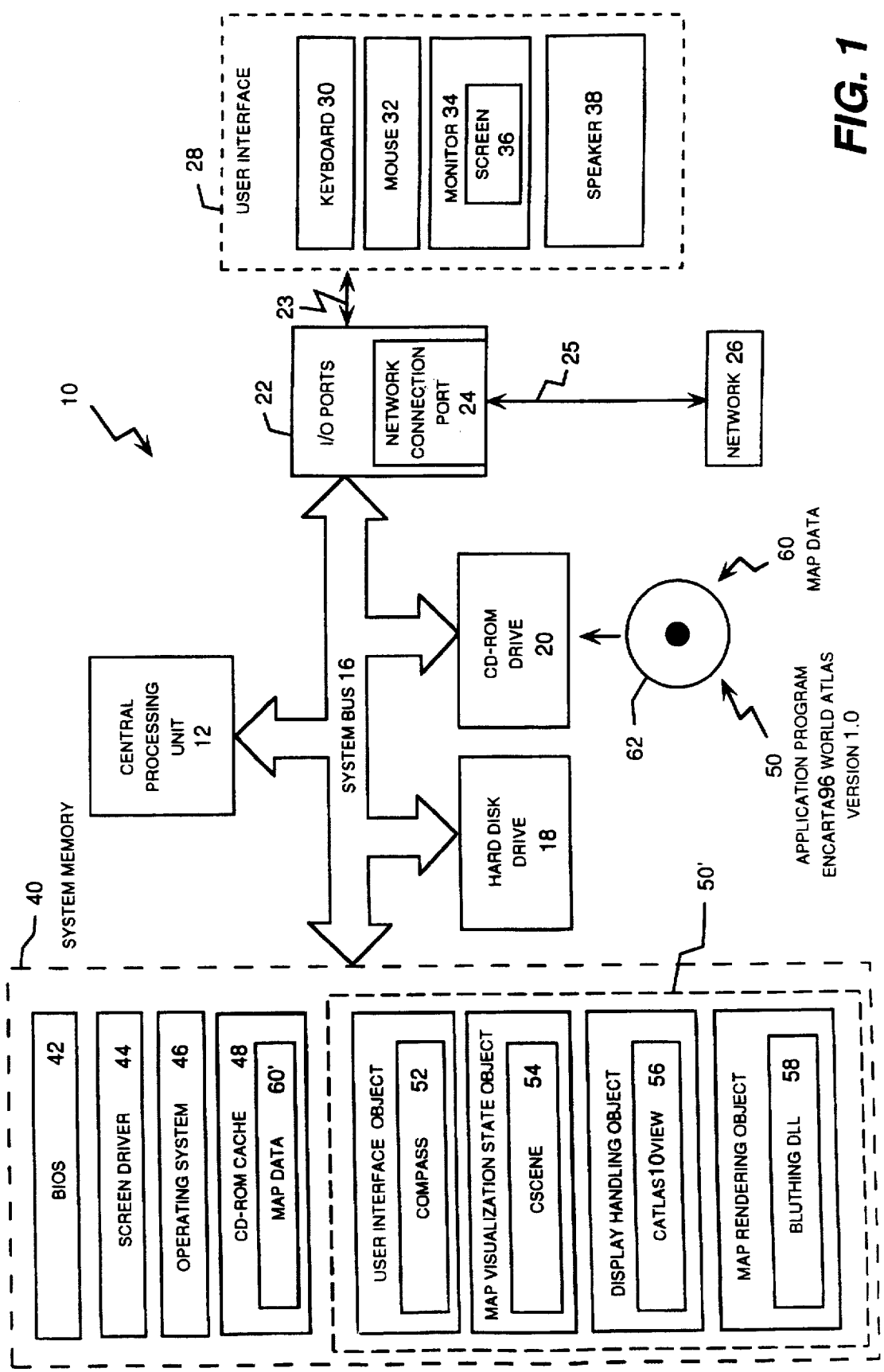
FIG. 1 is a functional block diagram of a personal computer system that provides the preferred environment of the present invention.

FIG. 1 shows the preferred operating environment for the present invention, a conventional personal computer system 10. The personal computer system 10 may be any of a variety of "IBM" or "IBM" compatible personal computers that can run in a protected mode, such as those known as PS/2 compatibles with 80486 or greater processors. The computer system 10 includes a central processing unit (CPU) 12 connected by way of a system bus 16 with internal I/O devices including a hard disk drive 18 and a CD-ROM drive 20. The system bus 16 also connects the CPU 12 with I/O ports 22 that are used to connect the computer system 10 with a plurality of external I/O devices. The I/O ports 22 generally include a network connection port 24 that is connected by way of a cable connection 25 to a network 26 such as a local area network (LAN), wide area network (WAN), Ethernet, the Internet, or the like. The I/O ports 22 also generally include a cable connector 23 that connects to a user interface 28 including a keyboard 30, mouse 32, monitor 34 with a display screen 36, and speaker 38 that form the basic elements of the user interface 28.

The CPU 12 is also connected by way of the system bus 16 to the system memory 40, a random access memory (RAM) resource preferably of at least about eight megabytes. The CPU 12 communicates by means of control, address, and data signals with the software resident within system memory 40 including an operating system. The preferred embodiment of the present invention operates in conjunction with a variety of operating systems including "WINDOWS NT" (version 3.51 or higher) and "WINDOWS 95," manufactured by Microsoft Corporation, Redmond, Wash., assignee of the present invention.

The computer system 10 has a distinct hierarchy of software retained in the system memory 40 that controls the operation of the system at all times. Communications generally occur only between adjacent levels in the hierarchy although there are some exceptions. The hardware, primarily the CPU 12 and system memory 40, is at the lowest level in the hierarchy. External I/O devices such as the user interface 28 are controlled by the basic input-output system (BIOS) 42, which is at the next level in the hierarchy. The BIOS 42 writes or reads bytes of information to or from memory address ports. A memory address port is a predefined location within the system memory 40 that is dedicated to communicating with an external device such as the monitor 34, a printer, a modem, or the like.

The BIOS 42 is usually located on a Read Only Memory (ROM) chip (not shown) and is specific to the computer that it supports. The BIOS 42 interfaces between the CPU 12 and the operating system by receiving instructions from the operating system and translating the instructions into manipulation of the memory address ports. The BIOS 42 provides a uniform interface between the computer's operating system software and the specific hardware configuration of a particular computer, primarily the CPU 12 and the system memory 40, allowing standardization of operating system instructions used to control the hardware of different computers.

Device drivers that support external I/O devices operate at the next level in the hierarchy. For example, the screen driver 44 is specifically configured to communicate with the monitor 34. The screen driver 44 responds to the presence of data placed in a predefined memory address port by the BIOS 42. Specifically, the screen driver 44 transmits that data from the predefined memory address to the monitor 34 in the particular protocol required by the monitor 34 so that the data is displayed properly on the screen 36. Other device drivers similarly support the other I/O devices: a hard disk driver supports the hard disk drive 18, a CD-ROM driver supports the CD-ROM drive 20, etc.

A standardized operating system 46, preferably "WINDOWS NT" (version 3.51 or higher) or "WINDOWS 95," operates the next level in the hierarchy. The operating system 46 is usually installed in a mass-storage computer memory such as the hard disk drive 18 or a read only memory (ROM) chip (not shown). During boot up (initialization) of the computer system 10, the operating system 46 and the device drivers such as the screen driver 44 are loaded into the system memory 40, usually from the hard disk drive 18. The operating system 46 provides the interface between the CPU 12 and other higher level modules such as application programs. Generally, higher level programs issue instructions, and the operating system 46 controls the operation of the CPU 12 so that these instructions are processed in an orderly manner.

The operating system 46 preferably organizes the instructions from application programs into chunks called "threads." A thread can be thought of as a "waitable" software capsule of instructions that can be queued for execution by the CPU 12. The operating system 46 may break the operation of multiple application programs into threads for sequential execution, thus allowing the CPU 12 to simultaneously support several application programs. This capability is known as multitasking. For example, the present invention preferably uses separate threads for map drawing and the user interface so that the user interface remains operational while a map is rendered. Similarly, one thread may read data while another decompresses previously read data.

Multitasking increases the speed of a computer's operations by allowing I/O devices such as the CD-ROM drive 20 to operate without idling the CPU 12. Generally, the CPU 12 can perform instructions much more quickly than data can be written to or read from a storage device such as the CD-ROM drive 20. Therefore, the CPU 12 would be idled if it had to wait for data to be written to or read from the CD-ROM drive 20. The use of waitable threads allows the operating system to reassign the CPU 12 whenever a task must be performed by a slower component of the system.

Application programs operate at the next level in the hierarchy to perform specialized functions. Common application programs include word processors, spread sheets, databases, games, etc. During operation, one or more application programs are loaded into system memory 40, usually from the hard disk drive 18, the CD-ROM drive 20, or some other external source by way of the network connection port 24. In performing their specialized functions, the application programs send I/O instructions to the operating system 46. In response, the operating system 46 sends I/O instructions to the BIOS 42, which implements the instructions by writing data to or reading data from a memory address port. The device drivers, such as the screen driver 44, interface directly with external services, such as the user interface 28, to transport data between the memory address ports and external devices.

In connection with the preferred embodiment of the present invention, about four megabytes of the system memory 40 is dedicated to providing a CD-ROM cache 48, a "least-recently-used" (LRU) cache memory resource. An LRU cache is a fixed-size cache memory in which the data that has been unused for the longest period of time is discarded when new data is read into the cache. The CD-ROM cache 48 is preferably configured as three separate LRU caches, one cache for reduced-detail data, a second cache for area, line, and point data, and a third cache for label data. Data is read from the CD-ROM drive 20 into the CD-ROM cache 48 for further processing during the operation of the computer system 10. A cache is a special memory subsystem in which frequently used data values are stored for quick access. Conventional CPUs include a small amount of built-in very fast cache memory, usually about 64k. Most motherboards are configured to allow the very fast cache memory to be expanded, typically by about 254k, through the installation one or more auxiliary cache memory chips. As about four megabytes of cache memory is preferred for the CD-ROM cache, a portion of the system memory 40 is used to provide a larger, although slower, CD-ROM cache memory. In future embodiments, larger provisions of built-in and/or auxiliary cache may be utilized to provide a faster CD-ROM cache.

A preferred embodiment of the present invention is a multimedia world atlas application program 50 known as "ENCARTA96 WORLD ATLAS, VERSION 1.0" sold by Microsoft Corporation on CD-ROM for use with personal computer systems such as the illustrative personal computer 10. It will be appreciated that the principles of present invention are not limited to world atlas software, but could equivalently be applied to any computer-implemented system for rendering two-dimensional views of a three-dimensional surface. It will further be appreciated that the preferred application program 50 could equivalently be implemented on host computers other than personal computers, and could equivalently be transmitted to the host computer by means other that a CD-ROM, for example, by way of the network connection port 24.

Notwithstanding the broad applicability of the principles of the present invention described above, it should be understood that the configuration of the preferred embodiment as a conventional CD-ROM for widely used personal computer systems provides significant advantages. In particular, the speed enhancing and memory saving innovations described herein are specifically designed to produce acceptable performance of the preferred multimedia world atlas application program 50, which is entirely contained on a conventional CD-ROM, when implemented on the preferred conventional personal computer system 10. It will therefore be appreciated that the speed enhancing and memory saving innovations described herein are best used in connection with a high-latency mass-storage computer memory device such as a CD-ROM, DVD disk, network server, the Internet, or the like.

In so configuring the preferred application program 50, certain trade-off balances, particularly between the often conflicting goals of reduced memory storage and increased processing speed, have necessarily been struck. It should be understood that variations of the trade-off balances struck in the preferred embodiments described herein are within the spirit and scope of the present invention, particularly in view of the fact the inevitable improvements in computer hardware and memory storage devices will make other trade-off balances feasible.

Referring still to FIG. 1, the preferred application program 50 and associated map data 60 are stored on a conventional CD- ROM 62. Upon loading the CD-ROM 62 in the CD-ROM drive 20 and activating the application program 50, a copy 50' of the application program 50 is loaded from the CD-ROM 62 into the system memory 40. The application program 50 is advantageously configured as a cooperating set of objects. An object is a self-contained program unit in object-oriented computer programming including instructions (e.g., executable code) or data (e.g., operands), or both. Objects communicate with each other by way of predefined interfaces. An interface is a data structure, syntax, and protocol for communicating predefined instructions or data with an object. Configuring software as a cooperating set of objects with predefined interfaces allows an individual object to be maintained or replaced without affecting the operation of other objects.

In the preferred application program 50 known as "ENCARTA96 WORLD ATLAS, VERSION 1.0," the objects include the user interface object 52, the map visualization state object 54, the display handling object 56, and the map rendering object 58. The map rendering object 58 is a special type of object known as a dynamic-link library. A dynamic-link library is a feature of the "WINDOWS" and "OS/2" families of operating systems that allows a specialized executable routine to be stored separately and loaded into the system memory 40 only when called by another object. Therefore, the map rendering object 58 is only intermittently resident in the system memory 40 during the operation of the preferred application program 50. The definitions of interfaces and assignments of programming responsibilities among these objects is described below with reference to FIG. 8. The general mechanics of object-oriented programming are well known to those skilled in the art and will not be further described herein.

During the operation of the preferred application program 50, two-dimensional views of a three-dimensional model of the surface of the Earth are rendered "on the fly" and displayed on the screen 36. The three-dimensional model of the surface of the Earth is stored on the CD-ROM 62, and portions thereof are read into the CD-ROM cache 48 for rendering, as needed. Rapid access to the stored three-dimensional model of the surface of the Earth during panning, zooming, and spinning operations is enabled by novel programming techniques that reduce the number of "seek" operations required to retrieve the data from the CD-ROM 62.

Specifically, a reduced-detail database to be displayed when panning, zooming, and spinning is selected and separated from detailed map data. Groups of spatially-contiguous reduced-detail pixels are stored as memory blocks, and groups of spatially-contiguous memory blocks are stored as sections, in sequentially-addressed memory locations on the CD-ROM 62. Reduced-detail data is retrieved in sections from sequentially-addressed memory locations on the CD-ROM 62, thus reducing the number of "seek" operations required to retrieve the reduced-detail data. The reduced-detail data is also read asynchronously to improve the speed of data retrieval.

The amount of detail that may be included in the reduced-detail database is necessarily dependent upon the desired performance of the computer system 10 in view of the speed of the processing hardware and software. Generally, the reduced-detail database is selected to present an amount of information sufficient to allow the user to understand what is shown on the display screen, while allowing real-time rendering of screen displays in an acceptable period of time. Thus, there is a trade-off between map detail and the performance of the computer system 10 during panning, zooming, and spinning operations.

In the preferred application program 50, the reduced-detail database is color-coded topographical and bathological map data. The topographical and bathological reduced-detail map data is visible while panning, zooming, and spinning, and other map details such as political boundaries, cities, rivers, and labels are not shown. The entire surface of the Earth is divided into a several thousand-sided polyhedron of constituent triangles. Each triangle defines a block of 128 pixels. Each pixel includes two one-byte (i.e., 8 bit) values: a color code and a shade code. It will therefore be appreciated that up to different 256 colors, and 256 different shades of each color, may be defined.

A trade off must be confronted, however, between the number of colors and shades and the memory storage requirement for the reduced-detail database. Specifically, conventional data compression techniques such as run-length encoding and "MSZIP" from Microsoft Corporation are more effective when contiguous chunks of data have the same color or shade. Therefore, reducing the number of colors and shades actually used generally reduces the amount of memory required to store the compressed reduced-detail database. The preferred application program 50 strikes a balance in this trade off by utilizing 16 different colors and five different shades (i.e., darkest, dark, mid, light, and lightest). More colors and shades may be feasible in other embodiments of the present invention.

Another trade off confronted in configuring the preferred application program 50 involves zooming. Specifically, virtually infinitely variable zooming may be provided by storing a single high-resolution reduced-detail database corresponding to the lowest altitude to be displayed, and averaging pixel values "on the fly" to render views from a higher altitudes. This approach advantageously minimizes the data storage requirement, but slows the rendering speed. Alternatively, a plurality of three-dimensional models of the surface of the Earth may be stored, one corresponding to each of a plurality of discrete zoom altitudes. This approach advantageously increases the rendering speed as pixel averaging is reduced, but increases the data storage requirement. The preferred application program 50 strikes a balance in this trade off by storing eight reduced-detail databases corresponding to eight discrete altitude levels. Pixel averaging is used to render views for altitudes between discrete altitudes. A different number of stored altitude levels, with pixel averaging between altitude levels, may be feasible in other embodiments of the present invention.

Another trade off confronted in configuring the preferred application program 50 involves rendering projections. Generally, an orthographic projection (i.e., looking toward the center of the Earth) may be produced for any section of the surface of the Earth defined by a field of view. A field of view may be defined by a view point vector (a unit vector positioned in the center of the screen 36 pointing toward the center of the Earth), an orientation vector (a unit vector positioned at the center of the screen 36 and pointing toward the top of the screen), and a distance (the radius of the Earth plus an altitude). From any vantage point defined by a view point vector, an orientation vector and a distance, a perspective projection may be produced by further including a tilt vector defining an angle of attack for the perspective projection. Enabling perspective projections increases flexibility, but also makes the user interface more difficult to understand. The preferred application program 50 strikes a balance in this trade off by only enabling orthographic projections. Perspective projections may be feasible in other embodiments of the present invention.

Figure 2A:
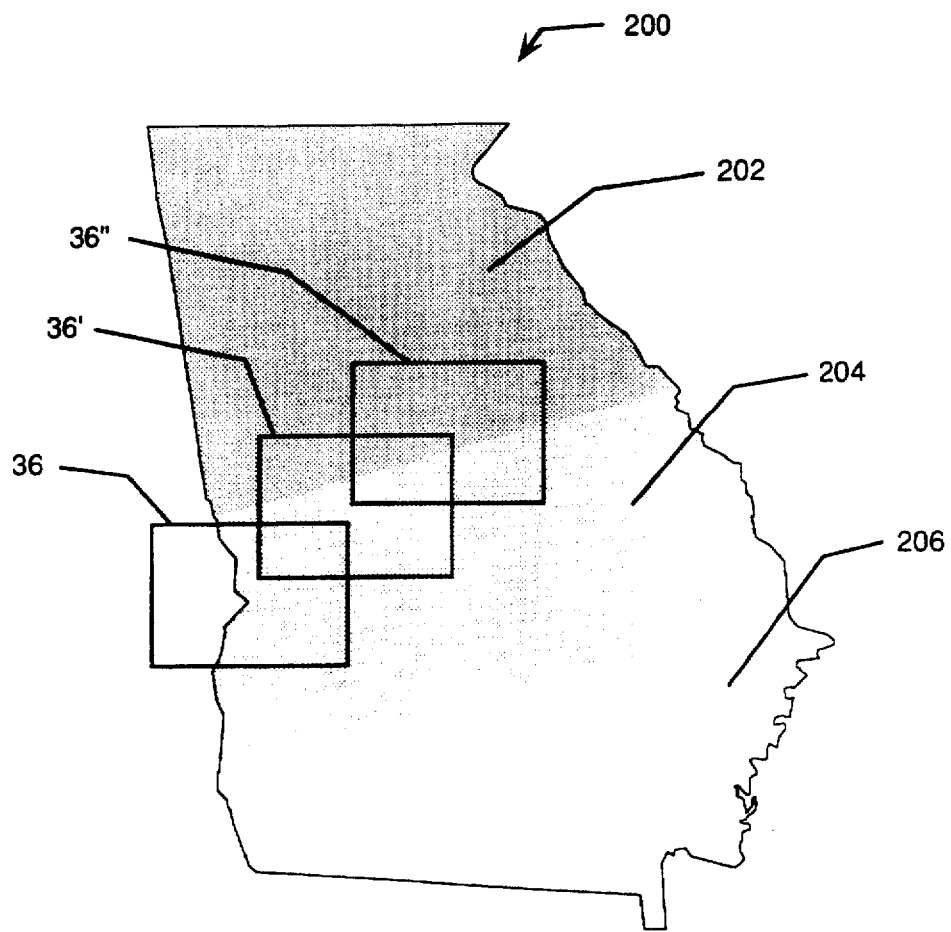
FIGS. 2A and 2B, illustrates a panning sequence in a computer-implemented atlas system.
Figure 2B:
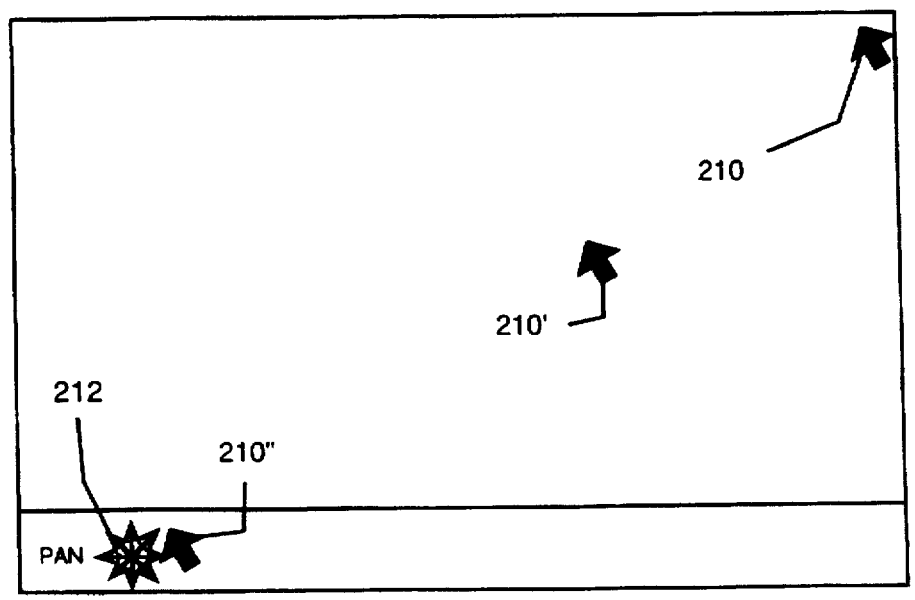

FIG. 2, including FIGS. 2A and 2B, illustrates a panning sequence in the preferred application program 50. FIG. 2A shows an illustrative map image 200, the State of Georgia. It should be understood that the preferred application program 50 does not render isolated political units as show in FIG. 2A, but rather renders sections of the surface of the Earth corresponding to various fields of view. The map image 200 is necessarily simplified and not shown in color or with the richness of detail actually provided by the preferred application program 50.

The illustrative map image 200 includes three differently shaded regions, 202, 204, and 206. These areas represent a two-dimensional orthographic projection of the section of the reduced-detail database corresponding to the illustrative map image 200. The shading scheme of FIG. 2 is a necessarily simplified depiction of the reduced-detail color-coded topographical and bathological map rendered on the display screen 36 during panning, zooming, and spinning operations. The display screen 36 effectively moves to the position indicated at 36' and then to the position indicated at 36" in response to a user command to pan in the direction shown in FIG. 2A.

Each succeeding screen display during a panning sequence overlaps the preceding screen display, allowing at least the overlapping portion of the succeeding screen display to be retrieved from the CD-ROM cache memory 48. The non-overlapping portion of a succeeding screen display may have to be retrieved from the CD-ROM drive 20.

It will be appreciated that FIG. 2A is merely illustrative, and that the amount of effective movement of the screen 36 to the positions indicated at 36' and 36" during a panning operation may be different in the preferred application program 50. Moreover, the amount of effective movement of the screen 36 during a panning operation may be varied to give the appearance of faster or slower movement, or in response to the speed of the hardware and software comprising the computer system on which the preferred application program 50 is running. In addition, the amount of detail in the reduced-detail database may be varied depending upon the desired performance and the speed of the processing hardware and software.

FIG. 2B shows a simplified graphic user interface for panning in the preferred application program 50. The corresponding graphical user interface in "ENCARTA96 WORLD ATLAS, VERSION 1.0" looks like a compass. Different user interfaces may be incorporated into later versions of the preferred application program. Any user interface operable for generating a panning command could equivalently be used in connection with the preferred embodiments of the present invention.

The panning operation depicted in FIG. 2A preferably occurs when the user moves a cursor 210 to the edge of the screen 36 as shown in FIG. 2B. The cursor is preferably operated by the keyboard 30, the mouse 32, or a joystick (not shown). When the cursor is moved near the border, for example within 30 pixels, the cursor turns into an arrow pointing in the panning direction. When a user predefined command is received, for example a user command caused by depressing the mouse button, the map pans in the direction indicated by the cursor. The panning operation is interrupted when the user moves the cursor away from the edge of the screen 36, for example to the position indicated at 210'.

The user may preferably pan in different directions by moving the cursor 210 to different portions of the edge of the screen 36. Many different panning directions may be enabled. As one example, defining a vector from the center to the top of the screen to be 0°, the user might be allowed to pan in twelve different directions: 0°, 30°, 60°, 90°, 120°, 150° 180°, 210°, 240°, 270°, 300° and 3300. In this embodiment, panning at 0° could be activated when the user moves the cursor to the center third of the top edge of the display screen 36, panning at 30° could be activated when the user moves the cursor to the right third of the top edge of the display screen 36, panning at 60° could be activated when the user moves the cursor to the upper third of the right edge of the display screen 36, etc.

An alternative mode of panning operation is preferably provided by a panning item 212 included in a menu bar as shown in FIG. 2B. The panning operation depicted in FIG. 2A preferably occurs when the user moves the cursor 210 to a predefined position, such as the position 210", and enters a "go" command such as a click of a mouse button. An operable position of the cursor 210 such as the position 210" typically includes a contiguous plurality of positions defining an invisible field on the display screen 36, as is familiar to those skilled in the art. The visible configuration of the menu item 212 renders the operation of the menu item 212 intuitively obvious. It will be appreciated that many other user interfaces may be provided in connection with other embodiments of the present invention. In particular, a "flight simulator" user interface could provide an entertaining and effective user interface.

Panning, zooming, and spinning are interactive, or interruptable upon user command. More specifically, the user may stop panning, or change panning direction, after each reduced-detail display is rendered. In this manner, an interrupt queue is checked after each reduced-detail display is rendered. Thus, a user need not specify a start and end point for a desired panning operation at the onset. Rather, the user may interactively guide the panning operation in real time.

FIG. 3, including FIGS. 3A–3F, illustrates interruptable detail rendering in the preferred application program 50. Generally, only reduced-detail data is displayed while panning, zooming, or spinning, and map detail is added to the displayed field of view whenever the user stops a panning, zooming, or spinning operation. Detail rendering for a particular field of view is added in successive layers so that the user may interrupt detail rendering between layers, for example, by resuming panning. Each detail layer is painted over the previously rendered layers. In this manner, an interrupt queue is checked each time a detail layer is rendered. Thus a user may resume panning or begin some other operation without having to wait for all of the detail associated with a field of view to be rendered.

Figure 3A:
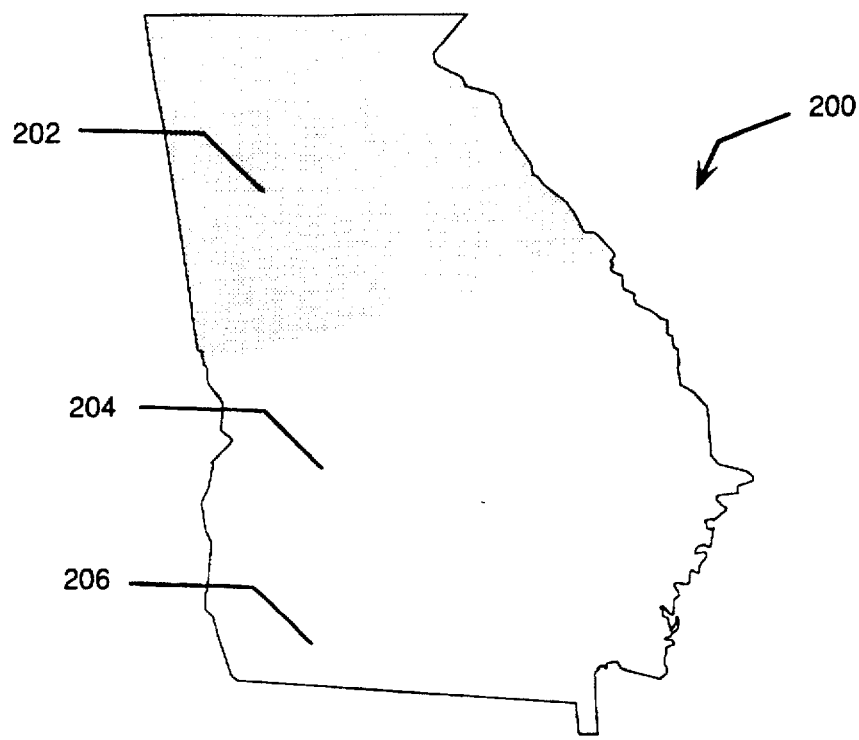
FIGS. 3A-3F, illustrates interruptable detail rendering in a computer-implemented atlas system.
Figure 3B:
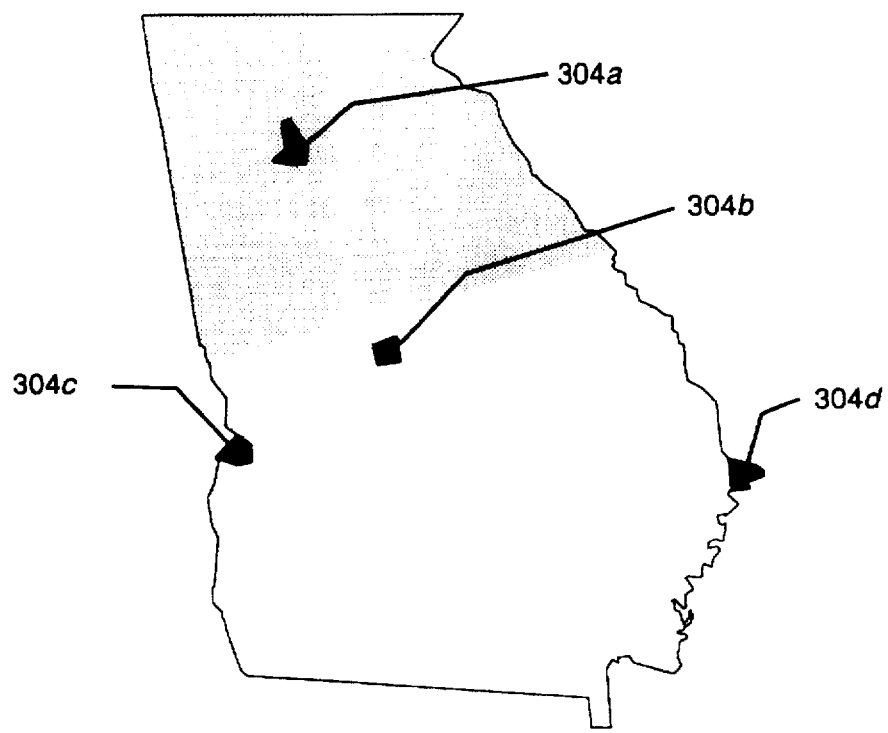

FIG. 3A illustrates the reduced-detail layer 200 of the field of view represented by the differently shaded regions 202, 204, and 206. The reduced-detail layer 200 shows only the color-coded topographical and bathological data displayed while panning, zooming, and spinning, as described previously. When a user stops panning, zooming, or spinning, detail is added to the displayed map image in successive layers. FIG. 3B illustrates the first detail layer, which preferably includes areas 304a through 304d. Area detail is typically rendered to provide a unitary color or shade to a region that varies in topographical or bathological character. For example, area detail may be used to denote political subdivisions, urban areas, ice-covered areas, riparian areas, etc. In FIG. 3B, the illustrated areas 304a through 304d denote large urban areas.

Figure 3C:
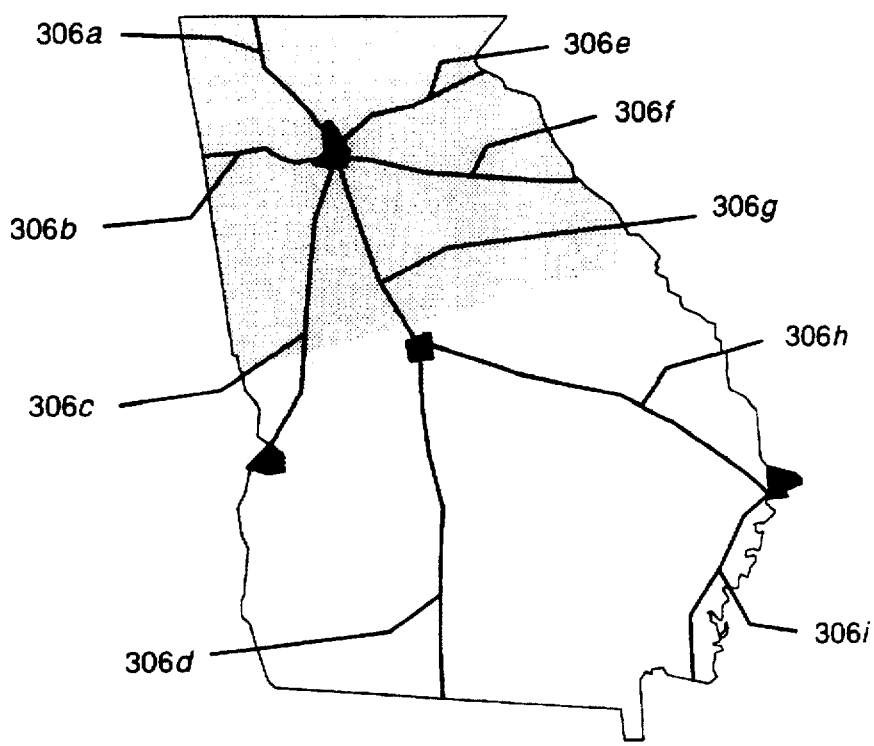
Figure 3D:
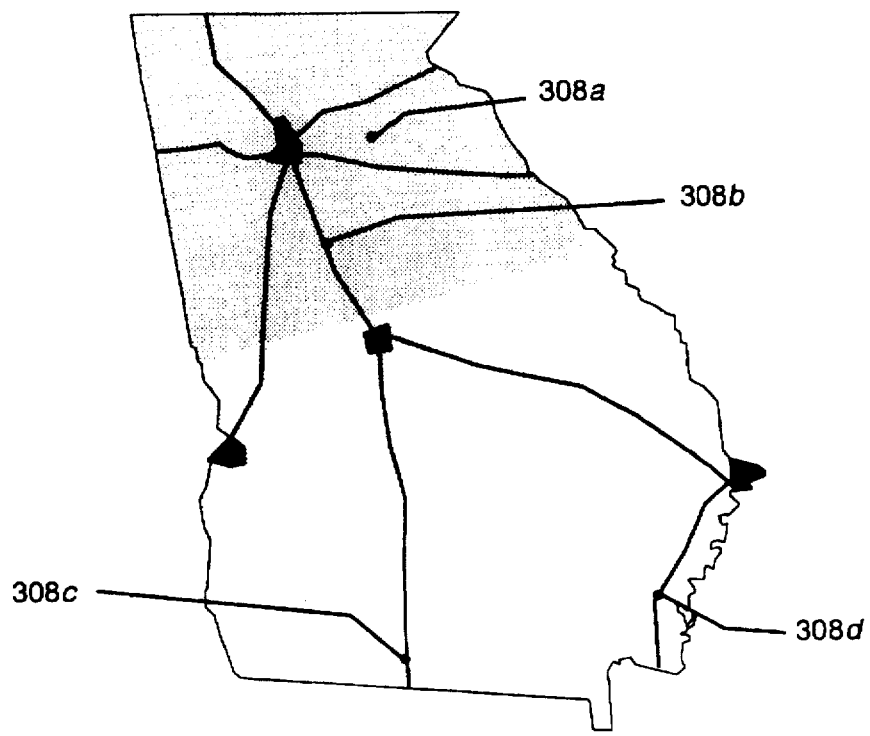

FIG. 3C illustrates the second detail layer, which preferably includes lines 306a through 306i. Line detail is typically used for political boundaries and map features such as roads and rivers. In FIG. 3C, the illustrated lines 306a through 306i denote interstate highways. FIG. 3D illustrates the third detail layer, which preferably includes points 308a through 308d. Point detail is typically used for cities, landmarks, and other points of interest. In FIG. 3D, the illustrated points 308a through 308d denote smaller urban areas. A points is preferably displayed only if a label associated with the point is also displayed, as described below.

Figure 3E:
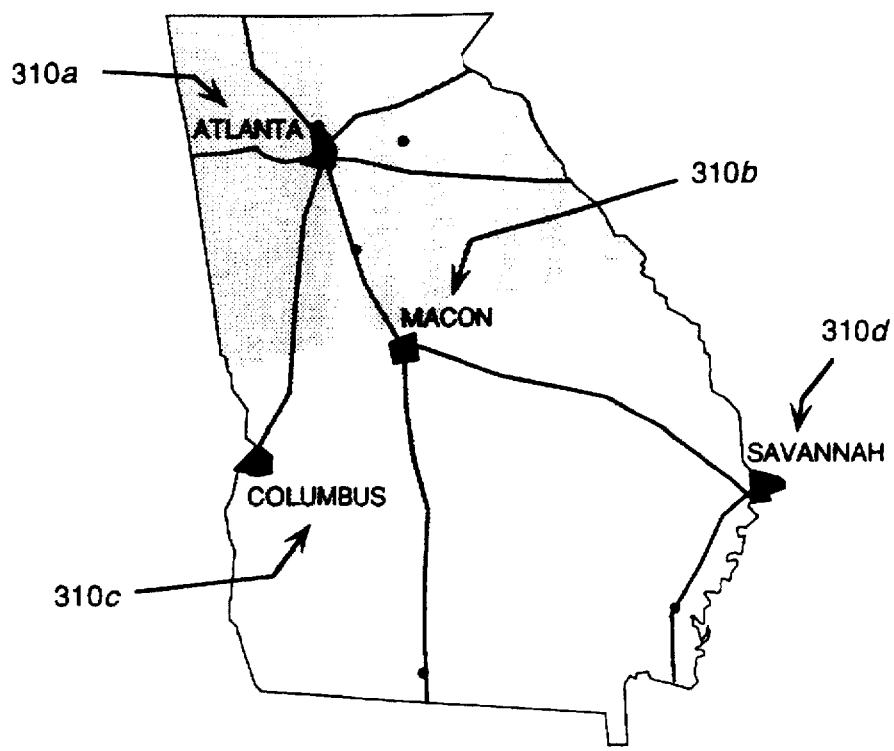

FIG. 3E illustrates the fourth detail layer, which preferably includes labels 310a through 310d. Labels are preferably organized in system of rendering priority. For example, country labels may have the highest priority, then states, then major cities, then smaller cities, then towns, etc. Higher priority labels may be displayed in a larger type face. Interruptable label rendering is enabled in the preferred application program 50 by rendering labels through a series of 100 millisecond iterations. Thus, labels are generated for a first 100 millisecond iterations. The first set of labels is then displayed and an interrupt queue is checked for an interrupt. If an interrupt has not occurred, labels are generated for a second 100 millisecond iterations. The second set of labels is then displayed and the interrupt queue is again checked for an interrupt. This procedure is repeated until all of the labels have been rendered, or until an interrupt is received.

Figure 3F:
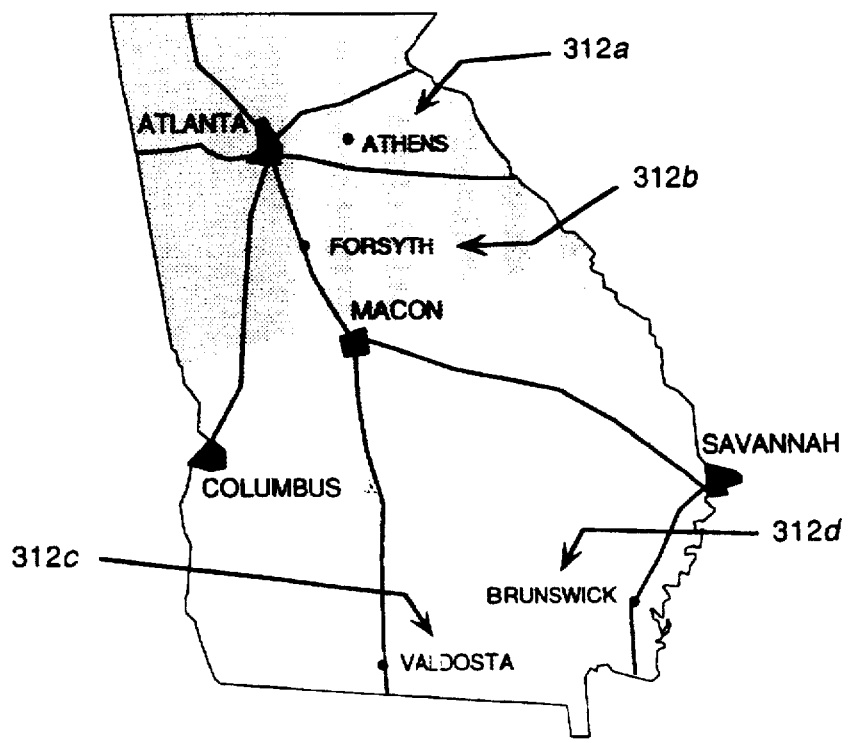

In FIG. 3E, the labels rendered pursuant to the first 100 millisecond iteration are represented by the labels 310a through 310d corresponding to Atlanta, Macon, Columbus and, Savannah, respectively. In FIG. 3F, the labels rendered pursuant to the second 100 millisecond label rendering iteration are represented by the labels 312a through 312d corresponding to Athens, Forsyth, Valdosta, and, Brunswick, respectively. It should be understood that the labels 310a through 310d need not correspond to the areas 304a through 304d, and the labels 312a through 312d need not correspond to the points 308a through 308d, as shown in FIGS. 3E and 3F.

Flexibility to select map content "on the fly" is possible in the preferred embodiment of the present invention because two-dimensional views are rendered "on the fly." Specifically, the present invention could allow a user to select among different detail sets "on the fly." For example, different detail sets may be organized for political subdivisions, roads, cultural points of interest, etc. When the user selects political subdivisions, political subdivision detail will be rendered; when the user selects roads, road detail will be rendered, etc.

Figure 4A:
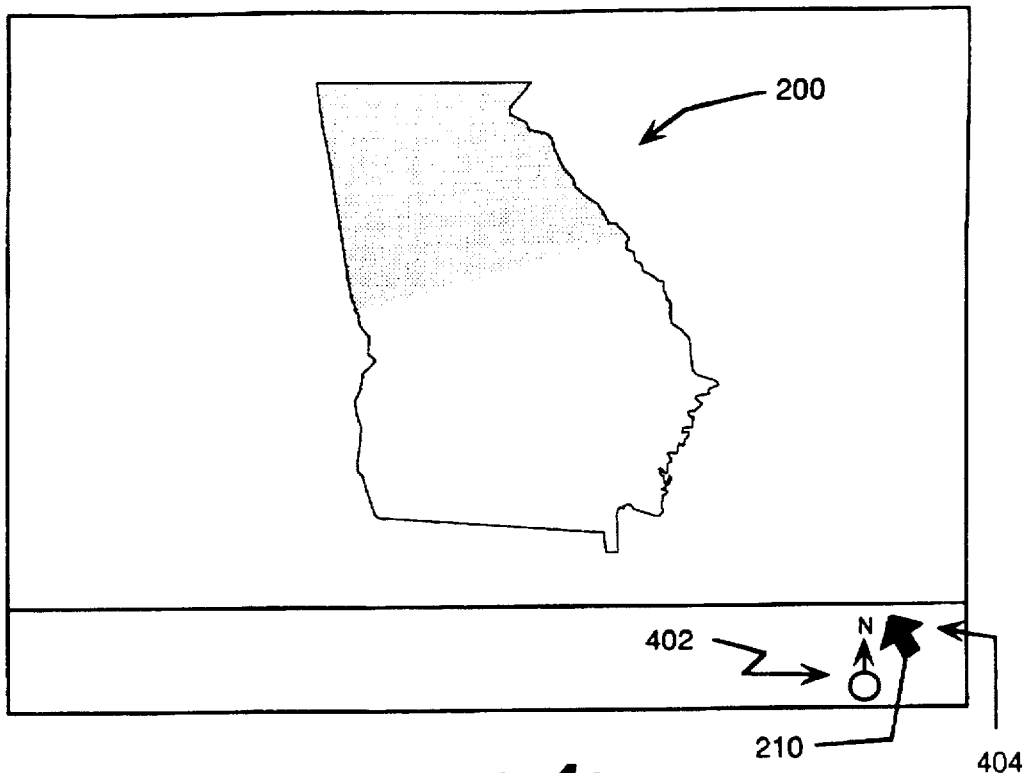
FIGS. 4A and 4B, illustrates changing the orientation of a screen display produced by a computer-implemented atlas system.
Figure 4B:
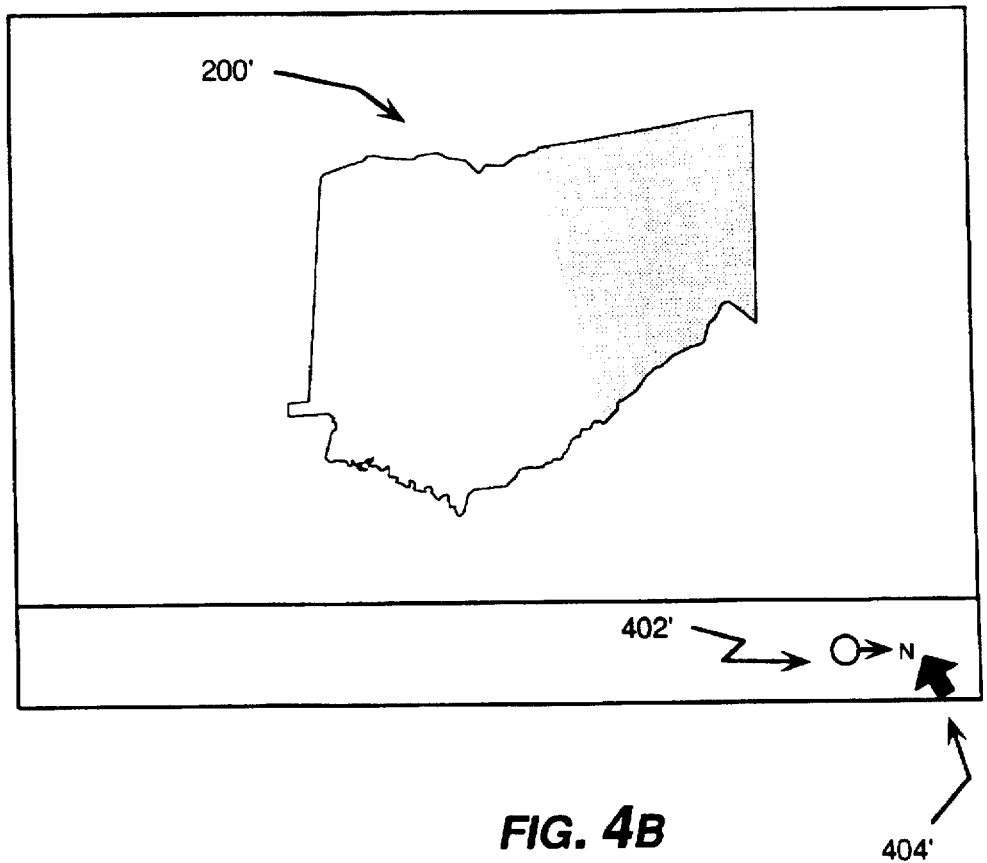

FIG. 4, including FIGS. 4A and 4B, illustrates changing the orientation of a screen display produced by a computer-implemented atlas system. In the preferred application program 50, the user interface object 52 allows a user to spin in approximately one degree increments to virtually any orientation. From any selected orientation, a user may pan in twelve different directions, as discussed previously. During continuous spinning, a sequence of reduced-detail views is displayed in 30° increments.

A simplified user interface for spinning is illustrated by a spinning item 402 included in a menu bar as shown in FIGS. 4A and 4B. The spinning operation is depicted in the transition from FIG. 4A to FIG. 4B, wherein the illustrative map image 200 shown in FIG. 4A spins 90° to the orientation indicated at 200' in FIG. 4B. The depicted orientation change preferably occurs when the user moves the cursor 210 to a predefined position, such as the position 404 in FIG. 4A, and then clicks and drags the cursor to the position 404' shown in FIG. 4B. An operable position of the cursor such as the position 402 is typically contiguous plurality of positions defining an invisible field on the display screen 36, as is familiar to those skilled in the art. The visible configuration of the menu item 402 renders the operation of the menu item 402 intuitively obvious. It will be appreciated that many other user interfaces may be provided in connection with other embodiments of the present invention. For example, in the user interface object 52 provided with "ENCARTA96 WORLD ATLAS, VERSION 1.0," a compass ring is used to effect spinning.

Figure 5A:
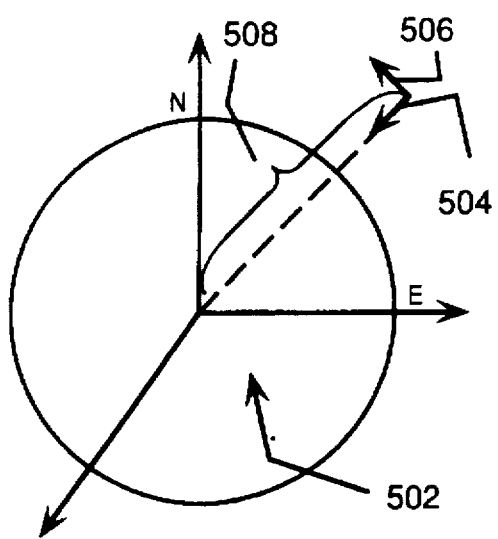
FIGS. 5A-5D, illustrates the use of a view point vector, an orientation vector, and a distance to define panning, zooming, and spinning in a computer-implemented atlas system.

FIG. 5, including FIGS. 5A–5D, illustrates the use of a view point vector, an orientation vector, and a distance to define panning, zooming, and spinning in a computer-implemented atlas system. The locations of the points of the surface of the Earth are defined with reference to a three-dimensional coordinate system 502. A field of view comprising a portion of the surface of the Earth is defined by conceptually locating the display screen 36 at a position in three-dimensional space defined with reference to the coordinate system 502. As discussed previously, the preferred application program 50 only renders orthographic projections of the surface of the Earth. As shown in FIG. 5A, a field of view for a particular orthographic projection is defined by three elements: (1) a unit vector 504 known as the view point vector positioned in the center of the display screen 36 and pointed toward the center of the Earth, (2) a unit vector known as the orientation vector 506 positioned at the center of the screen 36 and pointing toward the top of the screen 36, and (3) a distance 508 from the center of the Earth to the center of the display screen 36.

Figure 5B:
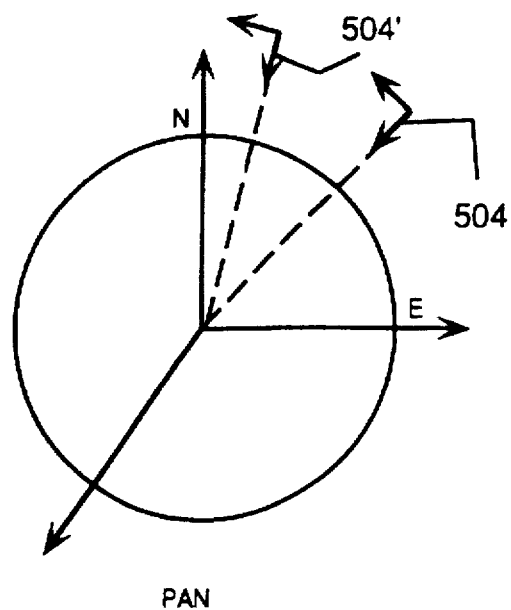
Figure 5C:
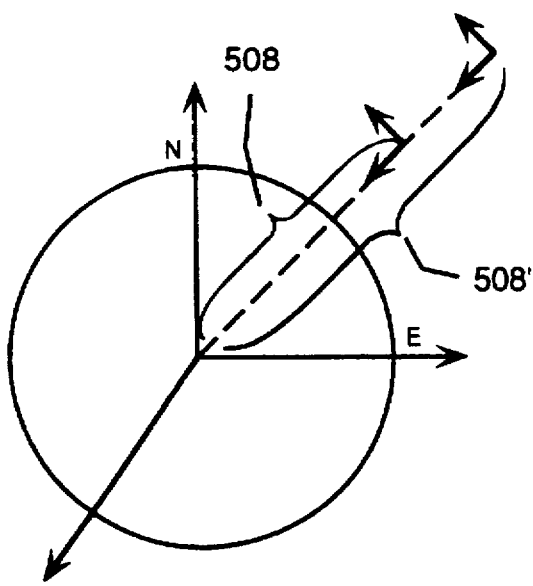
Figure 5D:
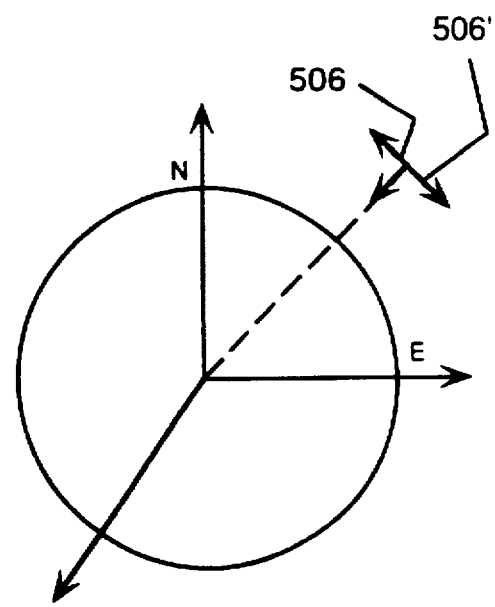

Panning, zooming, and spinning operations are illustrated by the transitions from FIG. 5A to FIGS. 5B–D, respectively. As shown in FIG. 5B, a panning operation is defined by changing the view point vector from the position indicated at 504 to the position indicated at 504', while holding the orientation vector 506 and the distance 508 constant. As shown in FIG. 5C, a zooming operation is defined by changing the distance from that indicated at 508 to that indicated at 508', while holding the view point vector 504 and the orientation vector 506 constant. As shown in FIG. 5D, a spinning operation is defined by changing the orientation from the position indicated at 506 to the position indicated at 506', while holding the view point vector 504 and the distance 508 constant.

Figure 6A:
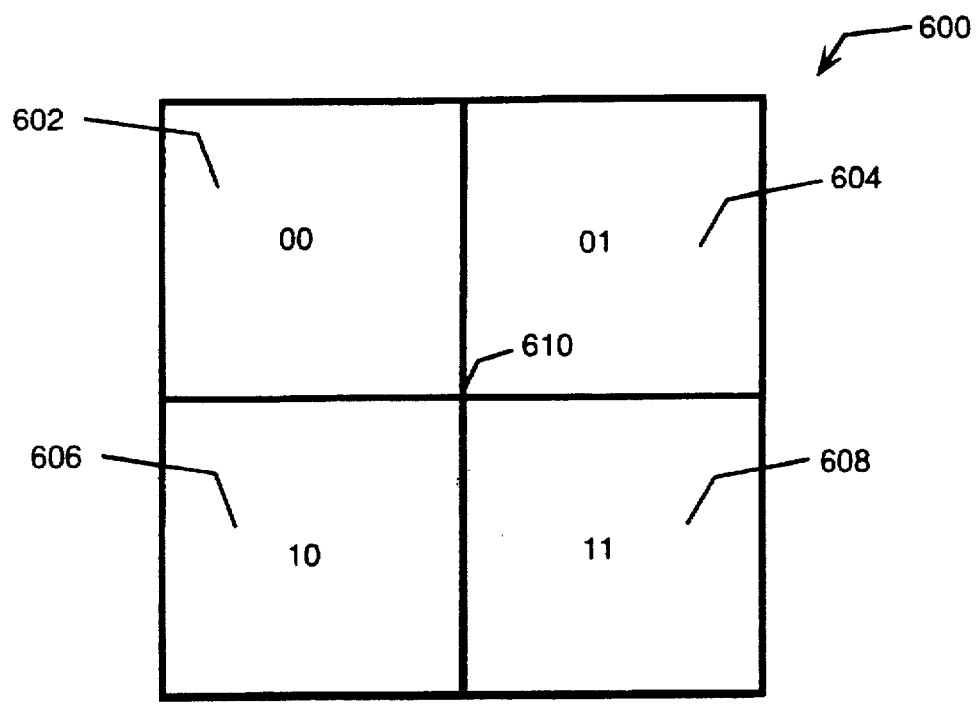
Figure 6B:
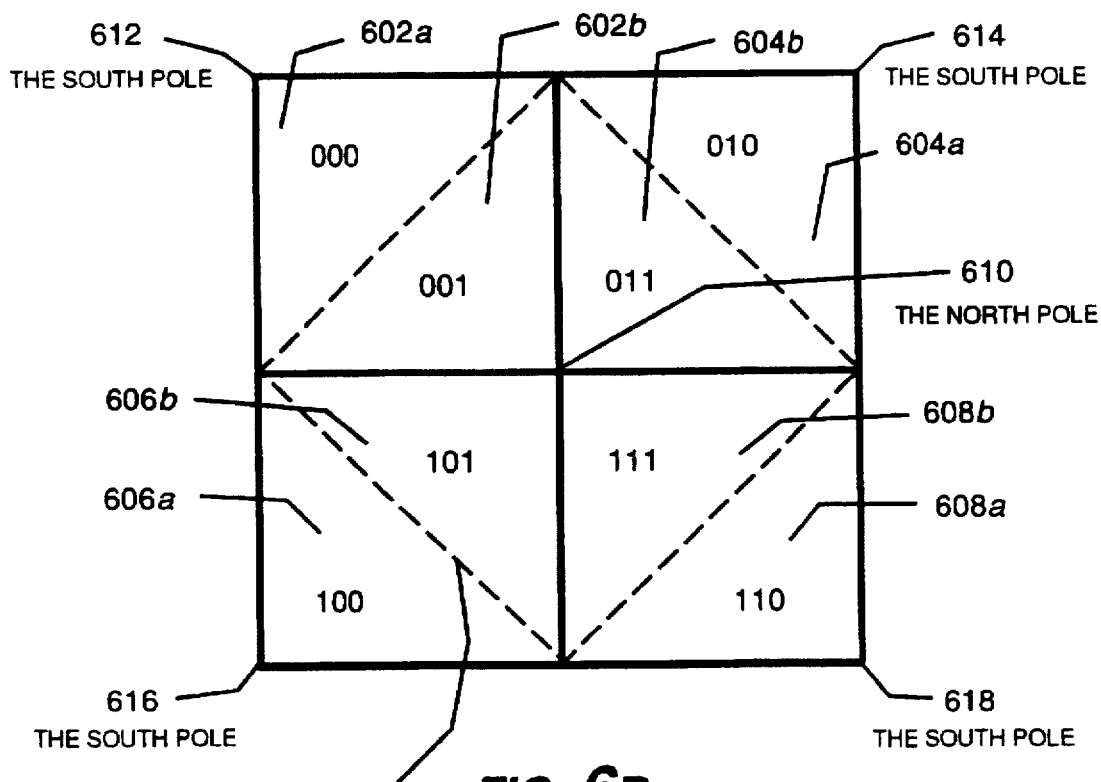
Figure 6C:
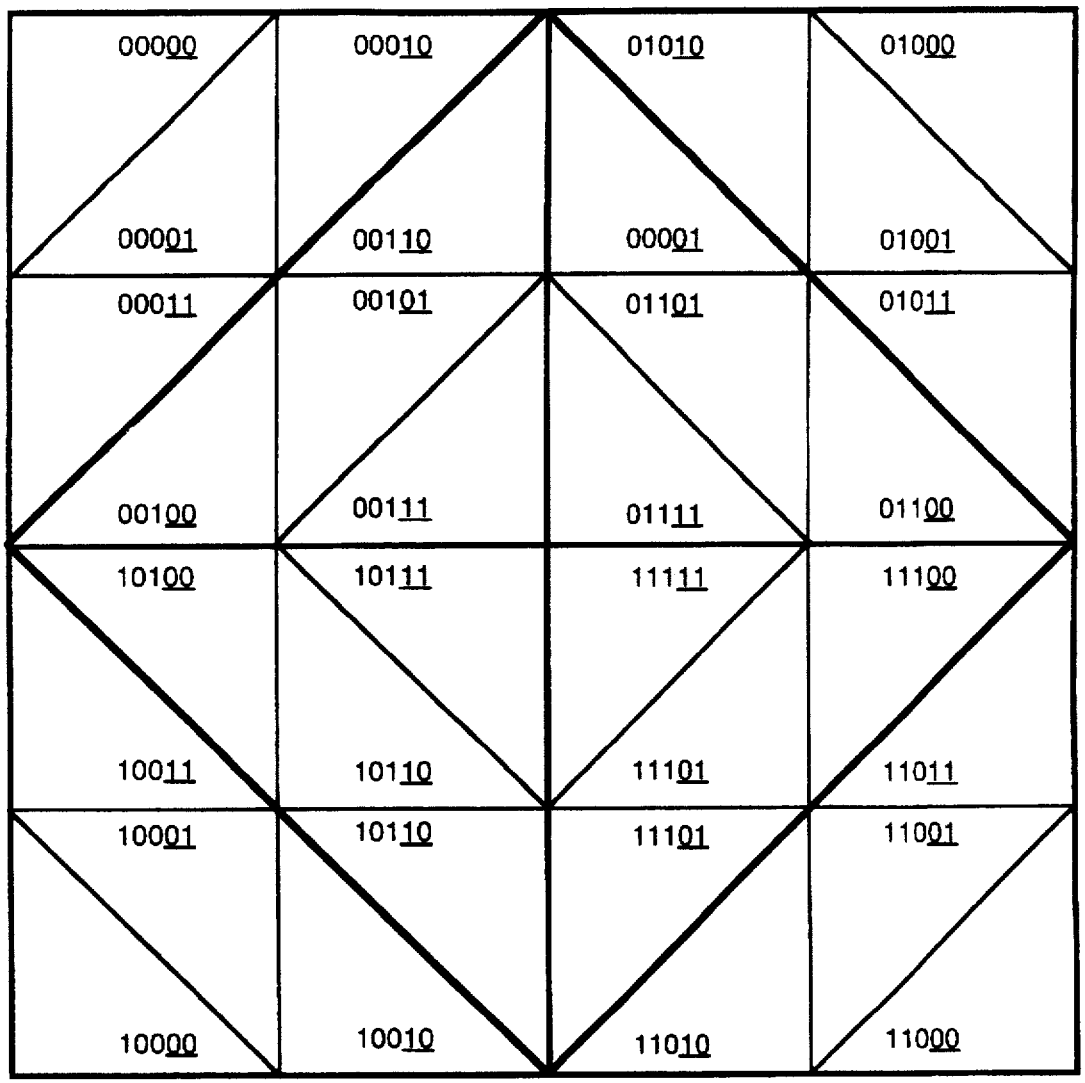

FIG. 6, including FIGS. 6A–6C, illustrates a hybrid-quad-tree data structure. The hybrid-quad-tree data structure provides a means for dividing the three-dimensional surface of the Earth into a large plurality of two-dimensional regions and assigning each two-dimensional region a unique binary identification number. The preferred application program 50 uses the illustrated hybrid-quad-tree data structure to organize and reference the reduced-detail database 600. As shown in FIG. 6A, the preferred hybrid-quad-tree data structure divides the reduced-detail database 600 into quadrants 602, 604, 606, and 608 wherein each quadrant is assigned a two bit representation. Specifically, "00" designates the quadrant 602, "01" designates quadrant 604, "10" designates quadrant 606, and "11" designates quadrant 608.

FIG. 6B illustrates the fundamental principle of the hybrid-quad-tree data structure, wherein each quadrant is divided into two equal triangular regions with a bit added to distinguish the regions. For example, a "0" may added to the triangular region that is further from the center 610 of the data structure, and a "1" may be added to the triangular section that is closer to the center of the data structure. Thus, quadrant 602 referenced by "00" is divided into triangular regions 602a referenced by "000" and 602b referenced by "001"; quadrant 604 referenced by "01" is divided into triangular regions 604a referenced by "010" and 604b referenced by "011"; quadrant 606 referenced by "10" is divided into triangular regions 606a referenced by "100" and 606b referenced by "101"; and quadrant 608 referenced by "11" is divided into triangular regions 608a referenced by "110" and 608b referenced by "111."

FIG. 6B also illustrates the three-dimensional character of the reduced-detail database 600. More specifically, the reduced-detail database 600 is a conceptual eight-sided polyhedron forming a basic three-dimensional structure. The center 610 is the north pole, and the bases of the triangles 602a, 604a, 606a, and 608a for the Equator (shown in dashed lines)). The eight-sided polyhedron is formed by conceptually "folding" the triangular regions 602a, 604a, 606a, and 608a so that the outer corners 612, 614, 616, and 618 meet to form a opposing center 610', the south pole. The triangular regions 602a, 602b, 604a, 604b, 606a, 606a, 608a, and 608b are further subdivided many times into several thousand two-dimensional triangular regions that approximate the three-dimensional surface of the Earth.

FIG. 6C illustrates the further steps in the subdividing process. Specifically, each triangular region 602a, 602b, 604a, 604b, 606a, 606a, 608a, and 608bis divided into four equal triangular regions with a two bits added to distinguish the regions. The illustrated process may repeated many times to produce a highly subdivided data structure wherein each discrete two-dimensional region has a unique identification number.

A major advantage of the present invention is very rapid access to the stored three-dimensional database 600, which allows two-dimensional orthographic projections to be rendered in real time. In the preferred application program 50, the smallest regions defined by the hybrid-quad-tree data structure comprise 128 contiguous pixels. The pixel data of each such region comprises a memory block that is stored in consecutively addresses memory locations on the CD-ROM 62. Each pixel is defined by a two byte value wherein one byte defines a color and the other byte defines a shade, as described previously. The color pixel data and shade pixel data are separately compressed using a conventional data compression technique such as run-length encoding or "MSZIP."

In addition, contiguous regions are grouped into sections that are stored in consecutively addresses memory locations on the CD-ROM 62 to the extent feasible. In other words, groups of spatially-contiguous reduced-detail pixels are stored as memory blocks, and groups of spatially-contiguous memory blocks are stored as sections, in sequentially-addressed memory locations on the CD-ROM 62. Reduced-detail data is retrieved from the database 600 in sections from sequentially-addressed memory locations, thus reducing the number of "seek" operations required to retrieve the reduced-detail data.

It will be appreciated that these "seek" operations on a mass-storage computer memory such as a CD-ROM are generally the most time consuming steps in retrieving data; once located, data may be read from sequentially-addressed memory locations very quickly. Thus, minimizing the number of "seek" operations required to retrieve the reduced-detail data greatly increases the speed of data retrieval from the CD-ROM 62.

Figure 7:
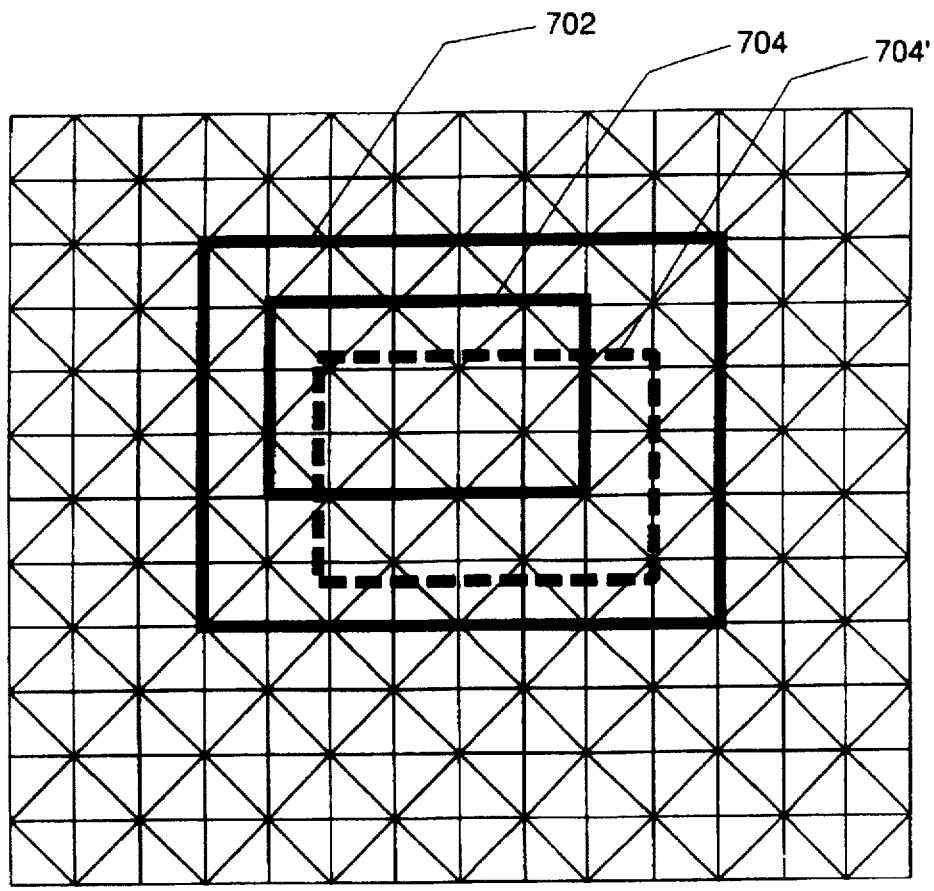
FIG. 7 illustrates caching an extended field of view in a computer-implemented atlas system.

FIG. 7 illustrates caching an extended field of view in a computer-implemented atlas system. During operation of the preferred application program 50, reduced-detail data is retrieved from the CD-ROM 62 and stored in the CD-ROM cache 48. As discussed previously, caching reduced-detail data improves panning, spinning, and zooming operations as a portion of each succeeding screen display includes data that was rendered for the preceding screen display. FIG. 7 illustrates a further advantageous aspect of the preferred operation of the CD-ROM cache 48. Specifically, an extended field of view 702 that is significantly larger than the data comprising a screen display 704 is read into the CD-ROM cache 48 whenever a "seek" operation is performed to retrieve reduced-detail data from the CD-ROM 62.

It will be appreciated that an extended field of view 702 can be read into the CD-ROM cache 48 quickly because the reduced-detail database 600 may be read in section from sequentially-addressed memory locations on the CD-ROM 62. The time consumed for each "seek" operation is thus used advantageously to return extra contiguous data. Small changes in the field of view, such as that illustrated in the panning transition from the screen display indicated at 704 to the screen display indicated at 704', may therefore be rendered without having to undertake a "seek" operation to retrieve reduced-detail data from the CD-ROM 62.

It should be understood that caching an extended field of view 702 would be particularly advantageous if the reduced-detail data was read from a network 26, such as the Internet, via the network connection port 24. In such a network embodiment, a local cache could be advantageously located in a local "web site" or server, or a system of caches could be advantageously located in hierarchical plurality of servers, to improve the efficiency of the data communication process. Such modifications are within the spirit and scope of the present invention.

Figure 8:
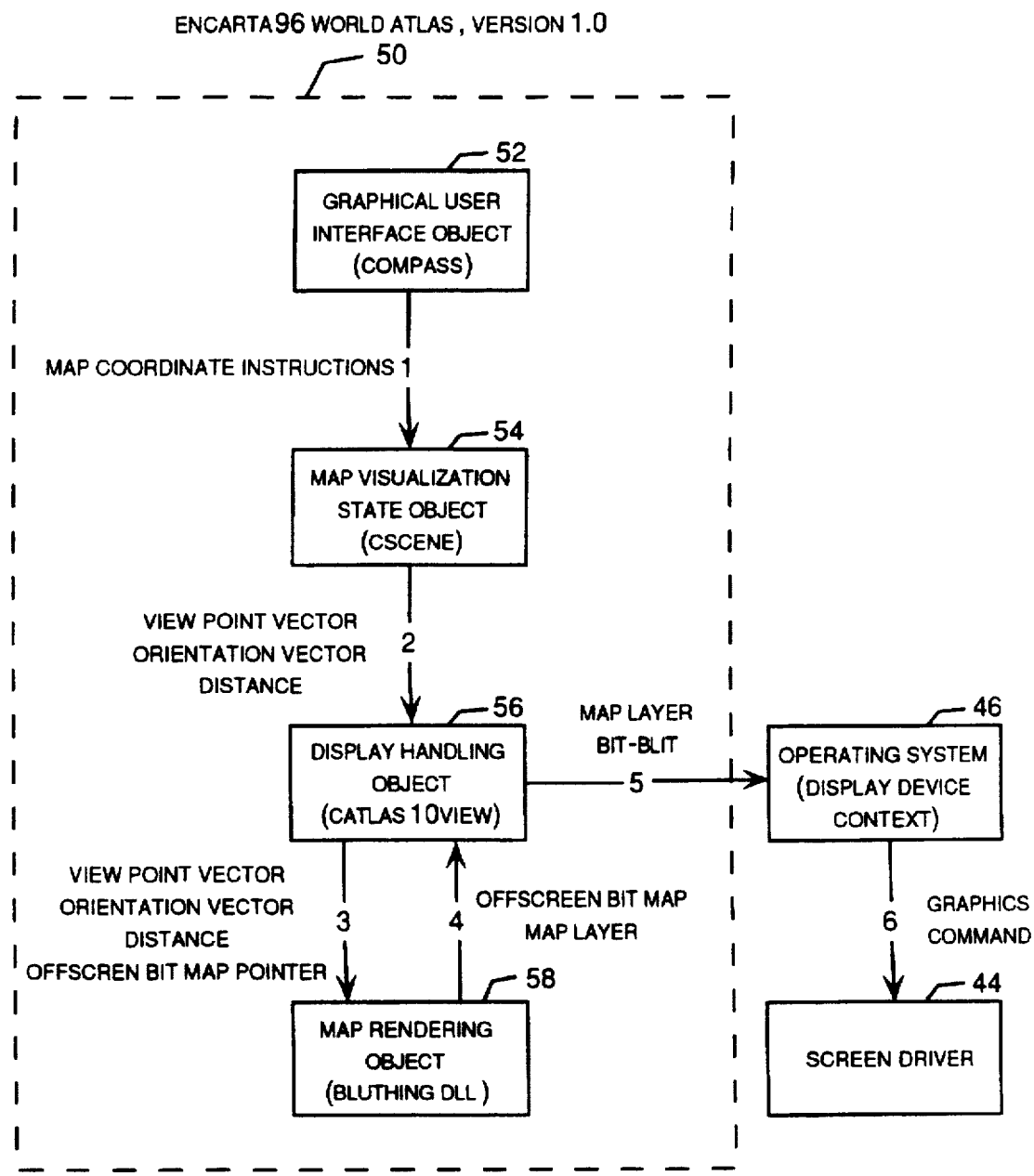
FIG. 8 is a functional block diagram illustrating the software architecture of a preferred computer-implemented atlas system.

FIG. 8 is a functional block diagram illustrating the software architecture of a preferred application program 50 The user interface object 52 receives user commands, preferably from the keyboard 30, the mouse 32, or a joystick (not shown). The user interface object 52 translates a predefined set of user commands into map coordinate instructions. The map coordinate instructions generated by the user interface object 52 are defined with reference to the three-dimensional coordinate system 502. For example, a "pan" user command generated by a user with the mouse 32 is translated into "change view point vector" command expressed in (x,y,z) units of the coordinate system 502. The map coordinate instructions generated by the user interface object 52 are passed to the map visualization object 54.

The map visualization object 54 determines the field of view based on the user commands received from the user interface object 52. The map visualization object 54 causes a new display to be rendered whenever the view point vector 504, the orientation vector 506, or the distance 508 changes. The map visualization object 54 therefore maintains and provides access to the three-dimensional coordinates of the reduced-detail database 600. To cause a new field of view to be rendered, the map visualization object 54 passes a view point vector 504, an orientation vector 506, and a distance 508 to the display handling object 56. The map visualization object 54, configured as a relatively simple finite state machine, can interrupt the display handling object 56 between map layers and then pick up where it left off.

The map visualization object 54 also maintains and controls an orientation display item corresponding to the orientation vector. The orientation display item indicates the compass direction corresponding to the direction from the center to the top of the display screen 36. Advantageously, the map visualization object 54 automatically changes the map orientation by 180° when the user pans over a pole, and the orientation display item is adjusted accordingly. This aspect of the preferred application program 50 avoids the annoying "display flipping" effect that would otherwise occur when panning over a pole while maintaining the orientation constant.

The display handling object 56 repaints the display screen by directing the map rendering object 58 to render a new map. The display handling object 56 interrupts the map rendering object 58 when the map visualization object 54 requests a new map. The map rendering object 58 responds to such an interrupt after rendering a map layer. The display handling object 56 also controls the size of the window in which the map is displayed and responds to resize messages. The display handling object 56 passes a view point vector 504, an orientation vector 506, a distance 508, and a pointer to an off-screen bit map to the map rendering object 58. The off-screen bit map is an available portion of the system memory 40 that is used to store an image immediately before the image is rendered on the display screen 36.

The map rendering object 58 checks the CD-ROM cache 48 to determine whether any reduced-detail data must be retrieved to render the requested map. If the required data is not already present in the CD-ROM cache 48, the map rendering object 58 reads the required reduced-detail sections from the CD-ROM 62 into the CD-ROM cache 48. When reading reduced-detail data from the CD-ROM 62 into the CD-ROM cache 48, the map rendering object 58 selects a plurality of memory blocks comprising an extended field of view in hybrid-quad-tree format. As described previously, the memory blocks are selected for reading from the CD-ROM 62 so that the reduced-detail data will be read from sequentially-addressed memory locations to the extent feasible.

The map rendering object 58 also computes an orthogonal projection of the reduced-detail data read into the CD-ROM cache 48 and loads the projection into the off-screen bit map. The reduced-detail data comprises the first layer of the map. Unless interrupted, the map rendering object 58 proceeds to read the area, line, point, and label layers from the CD-ROM 62 into the off-screen bit map. The map rendering object 58 notifies the display handling object 56 and checks for an interrupt after loading each map layer into the off-screen bit map.

The display handling object 56 uses a conventional bit-blit operation to render each layer of the off-screen bit map to the display screen 36. More specifically, the display handling object 56 communicates a bit-blit command to the display device context service, or an equivalent service, of the operating system 46. The display device context service or its equivalent, in turn, interfaces with the screen driver 44 to render the bit-blit data to the display screen 36. These techniques of the preferred application program 50 for rendering an image from an off-screen bit maps to a display screen are well known to those skilled in the art, and will not be further described herein.

Figure 9:
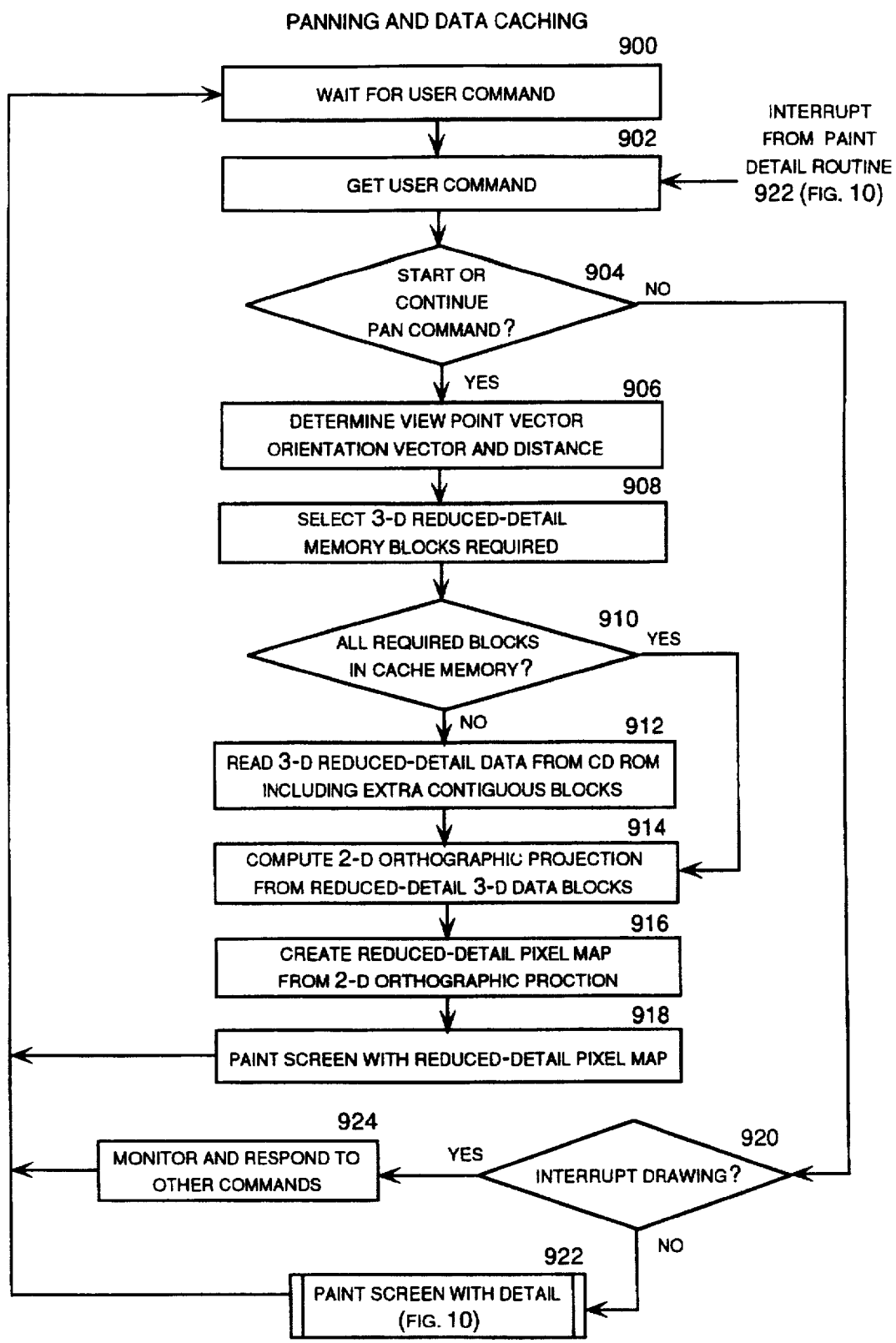
FIG. 9 is a logical flow diagram illustrating panning and data caching in a computer-implemented atlas system.

FIG. 9 is a logical flow diagram illustrating panning and data caching in a computer-implemented atlas system. In step 900, the preferred application program 50 waits for a user command. In step 902, a user command is received. Illustrative user commands were described previously with reference to FIGS. 2 and 4. It will be appreciated that a user command may be received while the preferred application program 50 is in the process of rendering map detail as illustrated on FIG. 10. In this case, the map rendering process is interrupted and the computer-implemented process illustrated by FIG. 9 continues from step 902.

Step 902 is followed by decision step 904 in which it is determined whether the received user command is a start pan command. If the received user command is a start or continue to pan command, the "YES" branch is followed to step 906 in which a field of view is defined by a view point vector, an orientation vector, and a distance as described previously with reference to FIG. 5. Step 906 is followed by step 908 in which the memory blocks required to display the defined field of view are selected. The memory blocks to be read are identified using the hybrid-quad-tree data structure described previously with reference to FIG. 6.

Step 908 is followed by step decision step 910 in which it is determined whether the required memory blocks are already present in the CD-ROM cache 48. If the required memory blocks are not already present in the CD-ROM cache 48, the "NO" branch is followed from step 910 to step 912 in which a three-dimensional reduced-detail data comprising an extended field of view is read from the CD-ROM 62, as described previously with reference to FIG. 7. The three-dimensional reduced-detail data memory blocks read from the CD-ROM 62 in step 912 are selected in a pre-defined order so that they are read in sections from sequentially-addressed memory locations to the extent feasible.

Referring back to decision step 910, if the required memory blocks are already present in the CD-ROM cache 48, the "YES" branch is followed to step 914, as step 912 in which three-dimensional reduced-detail data is read from the CD-ROM 62 is not required. Step 912 is also followed by step 914 in which a two-dimensional orthographic projection of the three-dimensional data in the CD-ROM cache 48 is computed and stored in an off-screen bit map. Step 916 is followed by step 918 in which the two-dimensional orthographic projection data is rendered on the display screen 36. After step 918, the computer-implemented process illustrated by FIG. 9 loops to step 900 in which preferred application program 50 waits for a user command.

Referring back to decision step 904, if the received user command is not a start or continue pan command, the "NO" branch is followed to decision step 920 in which it is determined whether the received user command is an interrupt drawing command. If the received user command is an interrupt drawing command, the "YES" branch from step 920 is followed to step 924 in which the preferred application program monitors and responds to the command that caused the interrupt. If the received user command is not an interrupt drawing command, the "NO" branch is followed from step 920 to routine 922 in which the map displayed on the screen 36 is painted with map detail. Routine 922 is described with more particularity below with reference to FIG. 10.

It will therefore be appreciated that the computer-implemented process illustrated by FIG. 9 continuously loops through the steps shown in response to user commands. A start pan command causes a reduced-detail field of view to be displayed on the display screen 36, and a stop pan command causes map detail to be rendered for the displayed field of view. The user may interrupt panning or detail rendering by communicating a user command. The preferred application program 50 responds to the interrupt command upon completion of the currently-processing layer.

FIG. 10 is a logical flow diagram illustrating interruptable detail rendering in a computer-implemented atlas system, as described previously with reference to FIG. 3. The computer-implemented process illustrated by FIG. 10 corresponds to routine 922 shown on FIG. 9. In decision step 1002, it is determined whether there are areas to be painted to the display screen 36. If there are areas to be painted, the "YES" branch is followed to step 1004 in which the areas are painted to the display screen 36. Step 1004 is followed by decision step 1006 in which an interrupt queue is checked to determine whether a user command was received while the areas were being painted. If a user command was received while the areas were being painted, the "YES" branch is followed to step 1008 in which the detail painting routine 922 is interrupted, and the computer-implemented process illustrated by FIG. 9 continues from step 902. The "NO" branches from decision steps 1002 and 1006 are followed by decision step 1010, in which it is determined whether there are lines to be painted to the display screen 36. If there are lines to be painted, the "YES" branch is followed to step 1012 in which the lines are painted to the display screen 36. Step 1012 is followed by decision step 1014 in which an interrupt queue is checked to determine whether a user command was received while the lines were being painted. If a user command was received while the lines were being painted, the "YES" branch is followed to step 1008 in which the detail painting routine 922 is interrupted, and the computer-implemented process illustrated by FIG. 9 continues from step 902.

The "NO" branches from decision steps 1010 and 1014 are followed by decision step 1022, in which it is determined whether there are labels to be painted to the display screen 36. If there are labels to be painted, the "YES" branch is followed to step 1024 in which labels are generated in priority order for 100 milliseconds. Step 1024 is followed by step 1026 in which the generated labels and associated points are painted to the display screen 36. Step 1026 is followed by decision step 1028 in which an interrupt queue is checked to determine whether a user command was received while the labels were being generated and painted. If a user command was received while the labels were being generated and painted, the "YES" branch is followed to step 1008 in which the detail painting routine 922 is interrupted, and the computer-implemented process illustrated by FIG. 9 continues from step 902.

The "NO" branch from decision step 1028 loops to step 1022 in which it is again determined whether there are labels to be painted. If so, the steps 1024 through 1028 are repeated and labels are generated for another 100 milliseconds and then painted to the display screen 36 along with the points associated with the labels. If there are no more label and associated points to be painted to the display screen 36, the "NO" branch is followed from step 1022 to step 1030 in which the computer-implemented process illustrated by FIG. 9 continues from step 900.

In view of the foregoing, it will be appreciated that the present invention provides an improved method and system for rendering two-dimensional views of a three-dimensional surface. The present invention further provides an improved method and system for storing data used to render two-dimensional views of a three-dimensional surface. The present invention further provides a multimedia world atlas computer program for a personal computer that allows real-time panning, zooming, and spinning, and that provides a generous compliment of map detail and multimedia richness within the memory constraints of a conventional CD-ROM.

It should be understood that the foregoing relates only to the preferred embodiment of the present invention, and that numerous changes may be made therein without departing from the spirit and scope of the invention as defined by the following claims.

What is claimed is:

1. A method for rendering a two-dimensional view of a three-dimensional surface, comprising the steps of:

receiving a user command defining a field of view portion of said three-dimensional surface;

selecting a sequence of memory blocks comprising a reduced-detail three-dimensional surface corresponding to said field of view, each said memory block comprising a group of spatially-contiguous pixels of said reduced-detail three-dimensional surface, said sequence of memory blocks comprising a spatially-contiguous section of said reduced-detail three-dimensional surface;

retrieving said section from sequentially-addressed locations within a mass-storage computer memory;

computing a two-dimensional projection of said section; and displaying said two-dimensional projection of said section on a display device.

2. The method of claim 1, wherein said step of receiving user commands defining a field of view comprises interpreting said user commands as a view point vector and an orientation vector.

3. The method of claim 1, wherein said reduced-detail three-dimensional surface comprises color-coded topographical and bathological map data.

4. The method of claim 1, wherein said step of selecting a sequence of memory blocks comprises identifying said memory blocks in hybrid-quad-tree format.

5. The method of claim 1, wherein said step of retrieving said section comprises retrieving at least one memory block comprising at least about 128 spatially-contiguous pixels.

6. The method of claim 1, wherein said step of computing a two-dimensional projection of said section comprises computing a two-dimensional orthographic projection of said section.

7. The method of claim 1, wherein said step of displaying said two-dimensional projection of said section comprises painting a computer screen comprising at least about 300,000 pixels.

8. The method of claim 1, further comprising the steps of:

after displaying said two-dimensional projection of said section on said display device, checking for an interrupt condition; and if said interrupt condition has not occurred, displaying a first detail layer corresponding to said field of view on said display device.

9. The method of claim 8, further comprising the step of, if said interrupt condition has occurred, discontinuing the rendering of said two-dimensional view of said three-dimensional surface.

10. The method of claim 9, further comprising the steps of:

after displaying said first detail layer, checking for said interrupt condition;

if said interrupt condition has occurred, discontinuing the rendering of said two-dimensional view of said three-dimensional surface; and if said interrupt condition has not occurred, displaying a second detail layer corresponding to said field of view on said display device.

11. The method of claim 10, wherein:

said step of displaying a first detail layer comprises displaying an area object; and said step of displaying a second detail layer comprises displaying a line object.

12. A method for rendering a panning sequence of two-dimensional views of a three-dimensional surface, comprising the steps of:

(a) receiving a user command defining a field of view comprising said panning sequence;

(b) selecting a sequence of memory blocks comprising a reduced-detail three-dimensional surface corresponding to said field of view, each said memory block comprising a group of spatially-contiguous pixels of said reduced-detail three-dimensional surface, said sequence of memory blocks comprising a spatially-contiguous section of said reduced-detail three-dimensional surface;

(c) retrieving said section from sequentially-addressed locations within a mass-storage computer memory;

(d) computing a two-dimensional projection of said section;

(e) displaying said two-dimensional projection of said section on a display device;

(f) checking for an interrupt condition; and (g) if said interrupt condition has not occurred, repeating steps (b)–(g) hereof.

13. The method of claim 12, further comprising the step of:

if said interrupt condition has occurred
       displaying a first detail layer corresponding to said field of view,
       after displaying said first detail layer, checking for said interrupt condition, and
       if said interrupt condition has not occurred, displaying a second detail layer corresponding to said field of view on said display device.

14. In a computer characterized by a central processing unit (CPU), a cache memory, a mass-storage computer memory, an input device for providing user commands to said CPU, and an output device for providing displaying two-dimensional views of a three dimensional surface, and a program module running on said computer, said program module operable for:

receiving a first user command defining a first field of view portion of said three-dimensional surface;

selecting a first sequence of memory blocks comprising said first field of view;

checking said cache memory to determine whether said memory blocks comprising said first field of view are present within said cache memory;

if said memory blocks comprising said first field of view are not present within said cache memory, reading an extended first field of view from said mass-storage computer memory into said cache memory, said extended first field of view comprising said first field of view and areas of said three-dimensional surface that are spatially-contiguous with said first field of view;

computing a two-dimensional projection comprising said first field of view;

displaying said two-dimensional projection comprising said first field of view on a display device;

receiving a second user command defining a second field of view portion of said three-dimensional surface;

selecting a second sequence of memory blocks comprising said second field of view;

checking said cache memory to determine whether said memory blocks comprising said second field of view are present within said cache memory; and if said memory blocks comprising said second field of view are present within said cache memory, using said memory blocks comprising said second field of view within said cache memory to display a two-dimensional projection comprising said second field of view on said display device.

15. A storage medium for a computer program used in a computer system, said storage medium comprising a computer program providing a method for rendering a two-dimensional view of a three-dimensional surface, comprising the steps of:

receiving a user command defining a field of view portion of said three-dimensional surface;

selecting a sequence of memory blocks comprising a reduced-detail three-dimensional surface corresponding to said field of view, each said memory block comprising a group of spatially-contiguous pixels of said reduced-detail three-dimensional surface, said sequence of memory blocks comprising a spatially-contiguous section of said reduced-detail three-dimensional surface;

retrieving said section from sequentially-addressed locations within a mass-storage computer memory;

computing a two-dimensional projection of said section;

displaying said two-dimensional projection of said section on a display device;

after displaying said two-dimensional projection of said section on said display device, checking for an interrupt condition;

if said interrupt condition has not occurred, displaying a first detail layer corresponding to said field of view on said display device.

16. The storage medium of claim 15, wherein said method further comprises the steps of:

after displaying said first detail layer, checking for said interrupt condition;

if said interrupt condition has occurred, discontinuing the rendering of said two-dimensional view of a three-dimensional surface; and if said interrupt condition has not occurred, displaying a second detail layer corresponding to said field of view on said display device.

17. A storage medium for a computer program used in a computer system, said storage medium comprising a computer program providing a method for rendering a panning sequence of two-dimensional views of a three-dimensional surface, comprising the steps of:

(a) receiving a user command defining a field of view comprising said panning sequence;

(b) selecting a sequence of memory blocks comprising a reduced-detail three-dimensional surface corresponding to a field of view corresponding to said panning sequence, each said memory block comprising a group of spatially-contiguous pixels of said reduced-detail three-dimensional surface, said sequence of memory blocks comprising a spatially-contiguous section of said reduced-detail three-dimensional surface;

(c) retrieving said section from sequentially-addressed locations within a mass-storage computer memory;

(d) computing a two-dimensional projection of said section;

(e) displaying said two-dimensional projection of said section on a display device;

(f) checking for an interrupt condition;

(g) if said interrupt condition has not occurred, repeating steps (b)–(g) hereof; and (h) if said interrupt condition has occurred
displaying a first detail layer corresponding to said field of view,
after displaying said first detail layer, checking for said interrupt condition, and
if said interrupt condition has not occurred, displaying a second detail layer corresponding to said field of view on said display device.

18. A storage medium for a computer program used in a computer system, said storage medium comprising a computer program providing a method for rendering two-dimensional views of a three-dimensional surface, comprising the steps of:

receiving a first user command defining a first field of view portion of said three-dimensional surface;

selecting a first sequence of memory blocks comprising said first field of view;

checking a cache memory to determine whether said memory blocks comprising said first field of view are present within said cache memory;

if said memory blocks comprising said first field of view are not present within said cache memory, reading an extended first field of view from a mass-storage computer memory into said cache memory, said extended first field of view comprising said first field of view and areas of said three-dimensional surface that are spatially-contiguous with said first field of view;

computing a two-dimensional projection comprising said first field of view;

displaying said two-dimensional projection comprising said first field of view on a display device;

after displaying said two-dimensional projection of said section on said display device, checking for an interrupt condition;

if said interrupt condition has not occurred, displaying a first detail layer corresponding to said field of view on said display device;

after displaying said first detail layer, checking for said interrupt condition;

if said interrupt condition has occurred, discontinuing the rendering of said two-dimensional view of said three-dimensional surface;

if said interrupt condition has not occurred, displaying a second detail layer corresponding to said field of view on said display device; and if said interrupt condition has occurred receiving a second user command defining a second field of view portion of said three-dimensional surface, selecting a second sequence of memory blocks comprising said second field of view, checking a cache memory to determine whether said memory blocks comprising said second field of view are present within said cache memory, and if said memory blocks comprising said second field of view are present within said cache memory, using said memory blocks comprising said second field of view within said cache memory to display a two-dimensional projection comprising said second field of view on said display device.

19. A storage medium for a computer program used in a computer system, said storage medium comprising a computer program providing a method for rendering two-dimensional views of a three-dimensional surface, comprising the steps of:

defining a reduced-detail database corresponding to said three-dimensional surface;

defining a detail database corresponding to said three-dimensional surface;

dividing said reduced-detail database into a plurality of memory blocks, each said memory block comprising a group of spatially-contiguous pixels;

grouping said memory blocks into a plurality of spatially-contiguous sections of said reduced-detail three-dimensional surface;

storing each said section in a plurality of sequentially-addressed locations within a mass-storage computer memory;

defining a plurality of layers comprising said detail database; and storing each said layer within said mass-storage computer memory.

20. The method of claim 19, wherein said reduced-detail database comprises color-coded topographical and bathological map data.

* * * * *